United States Patent
Halberstadt et al.

(10) Patent No.: US 10,367,424 B2
(45) Date of Patent: Jul. 30, 2019

(54) SWITCH MODE POWER SUPPLIES, CONTROL ARRANGMENTS THEREFOR AND METHODS OF OPERATING THEREOF

(71) Applicant: NXP B.V., Eindhoven (NL)

(72) Inventors: Hans Halberstadt, Groesbeek (NL); Frank van Rens, Horst (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/556,133

(22) PCT Filed: Jan. 29, 2016

(86) PCT No.: PCT/EP2016/051949
§ 371 (c)(1),
(2) Date: Sep. 6, 2017

(87) PCT Pub. No.: WO2016/142102
PCT Pub. Date: Sep. 15, 2016

(65) Prior Publication Data
US 2018/0054129 A1    Feb. 22, 2018

(30) Foreign Application Priority Data
Mar. 10, 2015  (EP) .................................... 15158372

(51) Int. Cl.
*H02M 3/335*  (2006.01)
*H02M 1/00*  (2006.01)

(52) U.S. Cl.
CPC ......... *H02M 3/33523* (2013.01); *H02M 1/00* (2013.01); *H02M 2001/0025* (2013.01); *H02M 2001/0032* (2013.01)

(58) Field of Classification Search
CPC .......... H02M 3/335–33592; H02M 2001/0025
See application file for complete search history.

(56) References Cited

U.S. PATENT DOCUMENTS

| | | | |
|---|---|---|---|
| 5,949,225 A | 9/1999 | Sawtell | |
| 2010/0027300 A1* | 2/2010 | Fang | H02M 3/33507 363/21.16 |

(Continued)

FOREIGN PATENT DOCUMENTS

CN      102386766 A       3/2012

OTHER PUBLICATIONS

An Analog Electronics Companion: Basic Circuit Design for Engineers and Scientists By Scott Hamilton, Published since 2003, Section 5.5 as quoted in article 5.5.: Integrators from IEEE, retrieved from https://www.globalspec.com/reference/53124/203279/5-5-integrators.*

(Continued)

*Primary Examiner* — Fred E Finch, III
*Assistant Examiner* — Rafael O. De León Domenech

(57) ABSTRACT

A control arrangement is disclosed for a switch mode power supply (SMPS), the SMPS comprising an opto-coupler configured to transfer, from a secondary side to a primary side of the switch mode power supply by means of an LED current, a control signal indicative of an error between an amplifier-reference-signal and an amplifier-sensed-signal indicative of an actual value of an output parameter, the control arrangement comprising: an error amplifier configured to integrate the error to determine the LED current; and a feedback loop configured to adjust the magnitude of the LED current by modifying the amplifier-reference-signal or the amplifier-sensed-signal in order to reduce the error. A SMPS comprising such a control arrangement, and a corresponding method is also disclosed.

14 Claims, 12 Drawing Sheets

(56) References Cited

U.S. PATENT DOCUMENTS

| | | | |
|---|---|---|---|
| 2010/0219799 A1* | 9/2010 | Minkner | G01R 15/181 323/212 |
| 2010/0270982 A1* | 10/2010 | Hausman, Jr. | H02M 5/293 320/166 |
| 2011/0018590 A1 | 1/2011 | Tai et al. | |
| 2012/0099344 A1* | 4/2012 | Adragna | H02M 3/3372 363/21.03 |
| 2014/0016373 A1* | 1/2014 | Zhang | H02M 3/33523 363/21.15 |
| 2014/0140107 A1 | 5/2014 | Chen et al. | |
| 2014/0301117 A1 | 10/2014 | Hirabayashi | |
| 2015/0115919 A1* | 4/2015 | Yang | H02M 1/32 323/282 |
| 2015/0198634 A1* | 7/2015 | Brinlee | G01R 31/28 324/72.5 |
| 2015/0357919 A1* | 12/2015 | Russell | H01R 31/065 363/21.12 |
| 2016/0094062 A1* | 3/2016 | Osswald | H02J 7/022 320/112 |
| 2016/0241148 A1* | 8/2016 | Kizilyalli | H05K 5/0247 |
| 2016/0270172 A1 | 9/2016 | Halberstadt | |
| 2016/0308452 A1* | 10/2016 | Motoki | H02M 3/33523 |

OTHER PUBLICATIONS https://en.wikipedia.org/wiki/Op_amp_integrator, available since Jul. 4, 2012, See, https://web.archive.org/web/20121101084628/http://en.wikipedia.org:80/wiki/Op_amp_integrator.*

Non-Final Office Action; U.S. Appl. No. 15/062,139; 12 pages (dated Jan. 8, 2018).

Final Office Action; U.S. Appl. No. 15/062,139; 10 pages (dated Jul. 25, 2017).

Non-Final Office Action; U.S. Appl. No. 15/062,139; 13 pages (dated Jan. 6, 2017).

Notice of Allowance; U.S. Appl. No. 15/062,139; 21 pages (dated Nov. 15, 2018).

Final Office Action; U.S. Appl. No. 15/062,139; 16 pages (dated Jul. 5, 2018).

* cited by examiner

SWITCH MODE POWER SUPPLIES, CONTROL ARRANGEMENTS THEREFOR AND METHODS OF OPERATING THEREOF

FIELD

This invention relates to switch mode power supplies, control arrangements therefore and methods of operating switch mode power supplies.

BACKGROUND

In many varieties of switch mode power supplies, an output parameter—typically output voltage—is regulated by means of an error derived in an error amplifier on the output or secondary side of the SMPS; a signal corresponding to the error is transmitted to the primary or input side, typically by means of an opto-coupler to maintain electrical isolation between the input and output sides. Such power supplies are often used in combination with consumer applications, such as adapters for laptops, cell phones, TV, desktop PCs and the like.

Whereas opto-couplers used in such power supplies typically output a low current, for example of the order of 80 µA, this may still require a current supply to the LED of, say 400 µA for a current transfer ratio of 0.2. Under low-load, or "no-load" conditions, this current represents a significant fraction of the power consumed by the SMPS. Since the electronic equipment connected to many such power supplies is typically left in an "off" or "standby" state for extended periods of time, the corresponding low load or no-load power consumption of switch mode power supplies is coming under increasing scrutiny with tightening requirements on wasted power, and in particular the power dissipated under low load or no-load conditions.

SUMMARY

According to a first aspect of the present disclosure, there is provided a control arrangement for a switch mode power supply, the switch mode power supply comprising an opto-coupler configured to transfer, from a secondary side to a primary side of the switch mode power supply by means of an LED current, a control signal indicative of an error between an amplifier-reference-signal and an amplifier-sensed-signal indicative of an actual value of an output parameter, the control arrangement comprising:
an error amplifier configured to integrate the error to determine the LED current; and
a feedback loop configured to modify the amplifier-reference-signal or the amplifier-sensed-signal in order to reduce the error.

In one or more embodiments the feedback loop is configured to modify the amplifier-reference-signal or the amplifier-sensed-signal (ref) based on the magnitude of the LED current.

In one or more embodiments the error amplifier is configured to provide an LED control signal for the LED, and wherein the feedback loop is configured to modify the amplifier-reference-signal or the amplifier-sensed-signal based on the LED control signal.

In one or more embodiments the feedback loop is configured to either:
add a compensation-signal to a received-reference signal, in order to provide the amplifier-reference-signal; or
add a compensation-signal to a received-sensed-signal, in order to provide the amplifier-sensed-signal.
in order to reduce the error.

In one or more embodiments the feedback loop comprises a compensating-resistor that is configured to conduct the LED current. A voltage dropped across the compensating-resistor may be configured to modify the amplifier-reference-signal or the amplifier-sensed-signal.

In one or more embodiments the control arrangement further comprises a resistive divider configured to provide the amplifier-reference-signal or the amplifier-sensed-signal. The resistive divider may include the compensating-resistor. The LED may be connected in parallel with a subset of the resistors in the resistive divider.

The resistive divider may be connected between an output terminal of the SMPS and a reference terminal (such as ground). The resistive divider may be connected between a reference-voltage-terminal and a reference terminal. The resistive divider may define a sensed-node or a reference-node, for providing the amplifier-reference-signal or the amplifier-sensed-signal.

In one or more embodiments the compensating-resistor comprises a non-linear resistor. The compensating-resistor may comprise a threshold-current-level. The control arrangement may further comprise a threshold-setting-block. Threshold-setting-block may be configured to:
determine an estimated-steady-state-current-level for the LED current during steady state operation; and
set the threshold-current-level based on the estimated-steady-state-current-level.

There may be provided a switch mode power supply, comprising any control arrangement disclosed herein and an opto-coupler.

According to a further aspect of the present disclosure a method of controlling a switch mode power supply comprising an opto-coupler configured to transfer, from a secondary side to a primary side of the switch mode power supply by means of an LED current, a control signal indicative of an error between an amplifier-reference-signal and an amplifier-sensed-signal indicative of an actual value of an output parameter, the method comprising:
deriving an LED current from the error by integrating the error; and
adjusting the magnitude of the LED current by modifying the amplifier-reference-signal or the amplifier-sensed-signal in order to reduce the error.

Adjusting the magnitude of the LED current may be effected in a feedback loop.

Modifying the amplifier-reference-signal or the amplifier-sensed-signal in order to reduce the error may comprise:
adding a compensation-signal to a received-reference signal, in order to provide the amplifier-reference-signal; or
adding a compensation-signal to a received-sensed-signal, in order to provide the amplifier-sensed-signal.

According to a further aspect of the present disclosure, there is provided a control arrangement for a switch mode power supply operable in a burst mode and comprising an opto-coupler configured to transfer a control signal indicative of a time-varying error between a reference signal and a signal indicative of an actual value of an output parameter from a secondary side to a primary side of the switch mode power supply by means of an LED current, the control arrangement comprising: an error amplifier configured to operate as a proportional-integrating error amplifier to derive the LED current from the time-dependant error; and a feedback loop configured to adjust the magnitude of the LED current between bursts by modifying the time-dependant error. The power supply may also be operable in a normal mode. It will be appreciated that configuring the error amplifier to operate as a proportional-integrating error amplifier need not preclude the amplifier from having additional functionality. In particular it may also have a differentiating functionality, and operation as a proportional-integrating error amplifier may include operation as a proportional-integrating-differentiating, or "PID", error amplifier.

It may thus be possible to reduce the LED current—one or both of instantaneous and average—in the opto-coupler, thereby reducing losses in the SMPS, during the intervals between bursts when the SMPS is operating in burst mode, relative to a SMPS which does not have such a feedback loop.

The output parameter may be output voltage.

Since it is the integrating function of the error amplifier which can result in a build-up of charge in an integrator, by providing that the feedback loop modifies the integrating function it may be possible to provide a solution which impacts the other aspect of operation of the error amplifier to only a small, or even negligible, extent. Thus, operation within bursts, or operation in another operating mode such as a normal mode which is not a burst mode, may be unaffected or substantially unaffected.

In one or more embodiments the feedback loop comprises a resistor. In particular, the resistor may be in a current path of the LED current; the resistor may be in a ground path of the proportional-integrating error amplifier. The skilled person would appreciate that the error amplifier may be otherwise configured so the resistor is in another path, such as a local ground. For example the current path of the LED current may be directly connected to the PI error amplifier through a local ground. The resistor may have a value between 10 ohms and 100 ohms, or between 10 ohms and 500 ohms, and in an example implementation the resistor may have a value of 20 ohms.

The feedback loop may be configured to modify the time-dependant error by adding a time-dependant offset to the reference signal.

An integrator, which may be comprised in the proportional-integrating error amplifier, may integrate the time-varying error. The time-dependant off-set may be determined from the integrated time-varying error to limit the integrated time-varying error. The feedback loop may be arranged to modify the integrating function of the error amplifier.

In one more embodiments the burst mode has a repetition period which is longer than 50 ms. The burst mode may have a repetition frequency which is no more than 100 Hz.

According to another aspect of the present disclosure there is provided a switch mode power supply, comprising a control arrangement as set forth above, and an opto-coupler. In particular the opt-coupler may be distinct from the control arrangement, and the opto-coupler may be configured to transfer a control signal indicative of a time-varying error between a reference signal and a signal indicative of an actual value of an output parameter from a secondary side to a primary side of the switch mode power supply by means of an LED current.

In one or more embodiments, the control signal may be used on the primary side of the SMPS to determine a timing between successive bursts.

According to a further aspect of the present disclosure there is provided a method of controlling a switch mode power supply operable in a burst mode and comprising an opto-coupler configured to transfer, from a secondary side to a primary side of the switch mode power supply by means of an LED current, a control signal indicative of a time-varying error between a reference signal and a signal indicative of an actual value of an output parameter, the method comprising: deriving an LED current from the time-varying error by a proportional-integrating error amplifier; and adjusting the magnitude of the LED current between bursts by modifying the time-dependant error by a feedback loop.

In one or more embodiments adjusting the magnitude of the LED current is effected in a feedback loop. In one or more embodiments the feedback loop comprises a resistor in the ground path of the proportional-integrating error amplifier.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
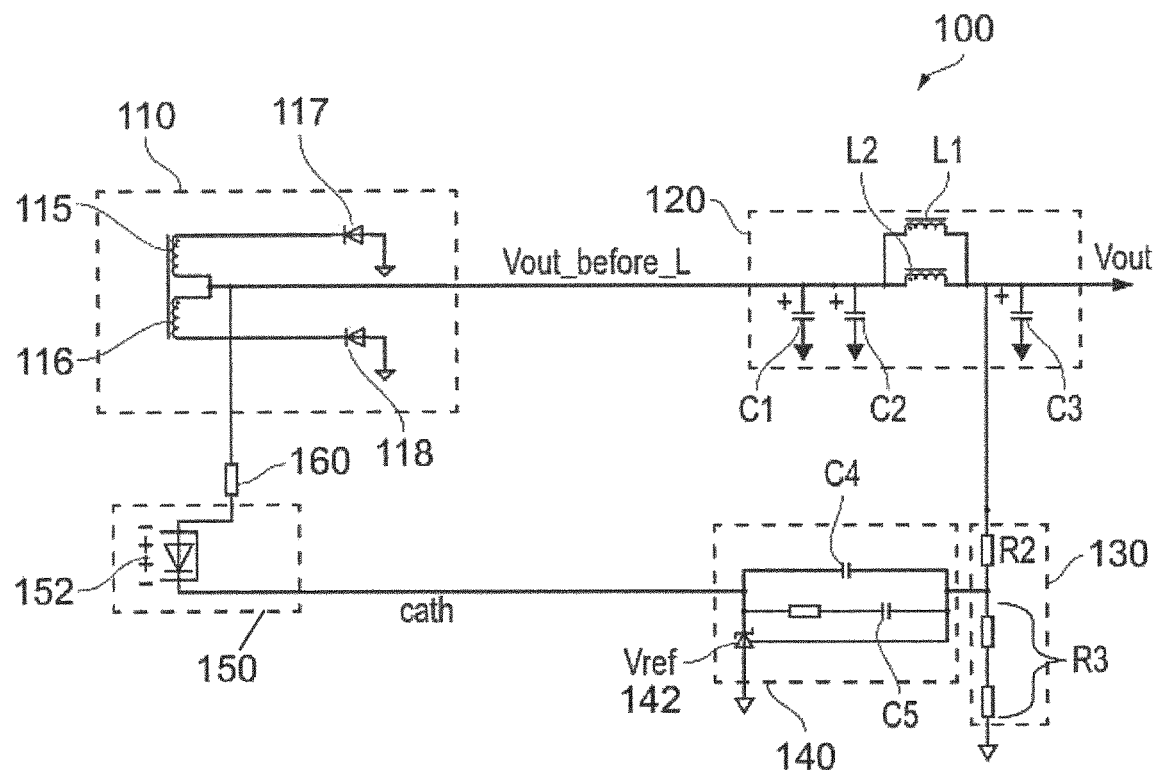
FIG. 1 shows an example of a circuit arrangement for controlling a SMPS, in block diagram form.

It should be noted that the figures are diagrammatic and not drawn to scale. Relative dimensions and proportions of parts of these figures have been shown exaggerated or reduced in size, for the sake of clarity and convenience in the drawings. The same reference signs are generally used to refer to corresponding or similar features in modified and different embodiments.

DETAILED DESCRIPTION OF EMBODIMENTS

FIG. 1 shows an example of a circuit arrangement 100 for controlling a switch mode power supply in operation, in block diagram form. The secondary side circuit of an SMPS which produces a voltage Vout_before_L, is shown in block 110. In this example, the SMPS is a resonant converter with a split secondary winding 115, 116. As will be familiar to the skilled person, the output diodes 117, 118 may be replaced by synchronous rectification switches. The output Vout_before_L is directed through a filter network 120 of inductors and capacitors, which may be as shown at L1, L2, C1, C2 and C3, to result in a relatively smoother output voltage Vout. The circuit includes a resistive divider block 130, to provide a scaled version, ref, of the output voltage Vout to a proportional-integrating (PI) error amplifier 140. The error amplifier 140 may be implemented, for example, as a TL 431 type of error amplifier, and includes one or more capacitors (shown as C4 and C5). Such an error amplifier typically has a fixed reference voltage Vref, indicated schematically by Zener diode shown at 142. The output of the error amplifier is, as shown, Vcath.

Current from the output Vout_before_L is also routed, through resistor 160, to the source LED 152 of an opto-coupler 150. Note that in this figure only the source (LED) side of the opto-coupler is shown; the output side of the opto-coupler, comprising a photodector to detect the level of current in the LED, and which is on the primary side of the SMPS, is not shown.

Resistor 160 may be also be referred to as the "fast lane" of the PI error amplifier. It determines the "proportional" P part of the behaviour. The P action sets the required loop bandwidth. The skilled person would appreciate that although as shown in the figure the resistor is between the output node of the SMPS and the opto-coupler, in other configurations the resistor may be between the opto-coupler and the error amplifier, and thus directly form part of the feedback network of the error amplifier. Whereas the "P" action sets the required loop bandwidth, the "I" (integration) action—defined primarily by the integrated capacitors C4 and C5—gives a zero offset from the desired output voltage.

Looking in more detail at capacitor network 120, the capacitors in this network act as filtering or stabilising capacitors at normal operating switching frequencies to reduce the ripple on the output Vout, but do not significantly affect operation of the error amplifier. In contrast, the integrating capacitor (or capacitors) C4, C5 of the PI error amplifier 140 helps to ensure loop stability for the error amplifier at normal operating frequencies, whilst the loop bandwidth is primarily defined by the "fast lane" resistor 160.

Figure 2:
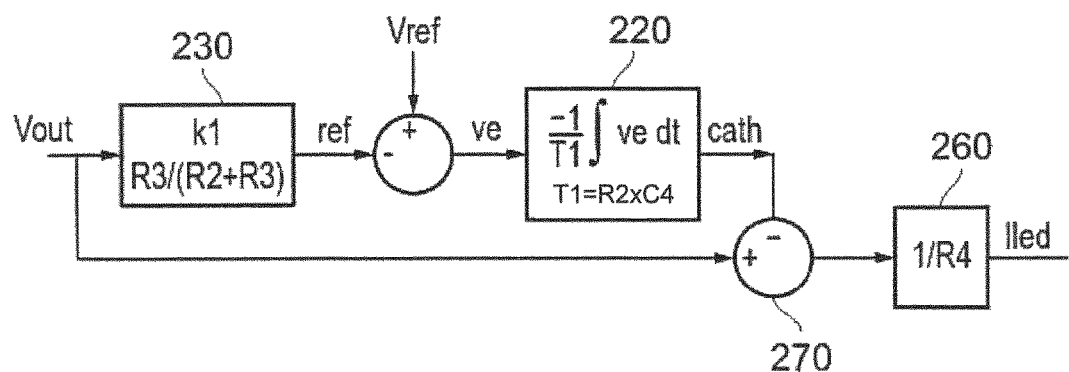
FIG. 2 shows, in functional block form, operation of the control circuit of FIG. 1.

Operation of this circuit is shown schematically in FIG. 2, in block form: Vout is converted to a current ILED and scaled by the resistor 160 (R4), corresponding to the left-hand side of FIG. 1, shown in the lower part of the figure. In an additional (upper) path, Vout is scaled by a factor k1 defined by the resistive divider 130, as shown in block 230. The result is combined with a reference voltage Vref defined in the error amplifier (as shown at 142), and integrated in integrator 220, defined by the integrating capacitor(s) C4 and C5. In an example error amplifier, Vref may be based on a fixed voltage of 2.5V, and the intended output voltage of the SMPS is then defined by the ratio 2.5/k1. The result of the integration is subtracted from the output voltage in combiner 270 before being passed to the "fast Lane" resistor 160, shown at 260. As already stated, in normal operation the fast Lane resistor 160 on the lower half of the figure defines the loop bandwidth at normal operation frequencies; the upper half of the figure provides stability for the error amplifier.

At low loads, SMPS such as that shown above are typically operated in discontinuous conduction mode (DCM). An example of a discontinuous conduction mode is burst mode, wherein the converter is operated in bursts: one conversion cycle, or a group of conversion cycles, is separated from the next one (or group of) conversion cycles, by an interval. That is to say the conversion cycle or group of conversion cycles is considered as a "burst". The repetition time between bursts may be considered as the burst interval, and the frequency with which bursts occur may be termed the burst frequency.

With decreasing output loads and maintaining the same energy transfer for each burst, the burst frequency is reduced, that is to say the time between bursts is increased. Even if the current required by the opto-coupler was constant, this current would then become of increasing significance as a contributor to the losses in the SMPS. However, as will be described below, the current in the opto-coupler tends to increase with decreasing burst frequency, and thus the losses are typically even higher.

Figure 3:
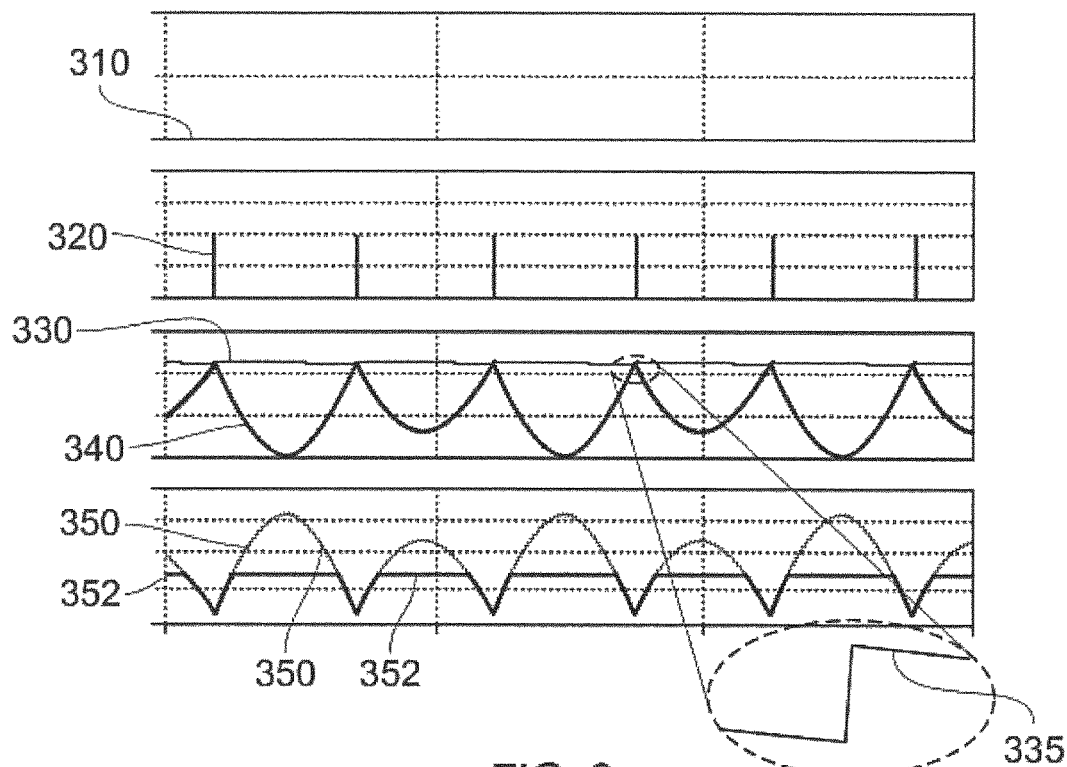
FIG. 3 shows various waveforms associated with FIG. 1.

FIG. 3 shows the various waveforms associated with the circuit described above, in the case that such a circuit is operated in burst mode. The top curve 310 shows a constant reference voltage Vref, which is the intended average output voltage. The second curve shows periodic individual bursts 320 (corresponding to a control signal "burst-on"). The third curve 330 shows the output voltage of SMPS. At each burst the output voltage rises, by an amount which is determined by the energy transferred in that burst. In order to aid the understanding of the present disclosure, a "burst" will be considered hereinunder as a single conversion cycle. Nonetheless the skilled person will appreciate that a burst may comprise a group of conversion cycles as described above. Between bursts, the voltage falls slowly. The rate of change of voltage depends on the output load, and in the example shown with widely spaced bursts, corresponding to very low load output, the rate of change is very shallow. Since this rate of change may be too shallow to be detectable on plot 330, an enlarged insert is shown, around a single burst, at 335.

Curve 340 shows a voltage Vcath at the output of the error amplifier. Immediately after a burst, the slope (that is to say the derivative) of Vcath is proportional to the difference between the actual output voltage at that moment and the intended output voltage (Vout−Voutref), where Voutref is defined as Vref/k1: at this moment the error current produced by the error amplifier is proportional to (Vout−Voutref), and this error current defines the charging rate of the integrating capacitor(s) C4+C5, and thus dv/dt, or the slope, of Vcath. In the hypothetical case that the error amplifier was a proportional error amplifier (P-error amplifier), the shape of Vcath would follow that of (an inverted copy of) Vout. However, it is apparent that the Vcath does not follow the linear path, but rather a parabolic path. This may be explained through the integrating action of the PI error amplifier: the integrator integrates the (linear) difference between Vout and Voutref (or their scaled equivalents ref and Vref), to result in a parabolic output at Vcath.

Curve 350 shows the current ILED in the opto-coupler LED. The difference (Vout−Vcath) generates the current in the error amplifier and thus in the opto-coupler. Thus since Vcath is parabolic, then also ILED is parabolic. As shown, the current ILED may be truncated, for instance in order to protect the opto-coupler, as shown at 352. Nonetheless, it is apparent from curve 350, that the current in the opto-coupler may be relatively high. For example, the peak current in the LED may be as high as 4 mA at no load situation when the SMPS is operating with a burst period of 50 msec.

The conclusion is that even if the opto-coupler current level chosen to define the burst-on time is set very low (say, perhaps 80 µA), the average opto-coupler current can be several milliamps: for example, consider an average opto-coupler LED current of 2 mA drawn from an output voltage of 12V. Due to the long time between bursts, the parabolic nature of ILED, and the fact that the rate of change of this current is fixed at the start of the burst interval, this gives an additional contribution to the power dissipation of 24 mW at the secondary side—and a part of that at the primary side. For applications with a higher output voltage such as adapters for laptops (at 19V) the power dissipated may be even higher. Such dissipation gives a serious limitation on the minimum value that can be reached for the no load input power of the converter.

It may be possible to reduce the power during the burst on interval and therefore getting a shorter burst period and therefore lower peak current and average opto-coupler current, but a lower power level during the burst on time also means lower efficiency at which the residual load must be delivered.

Figure 4:
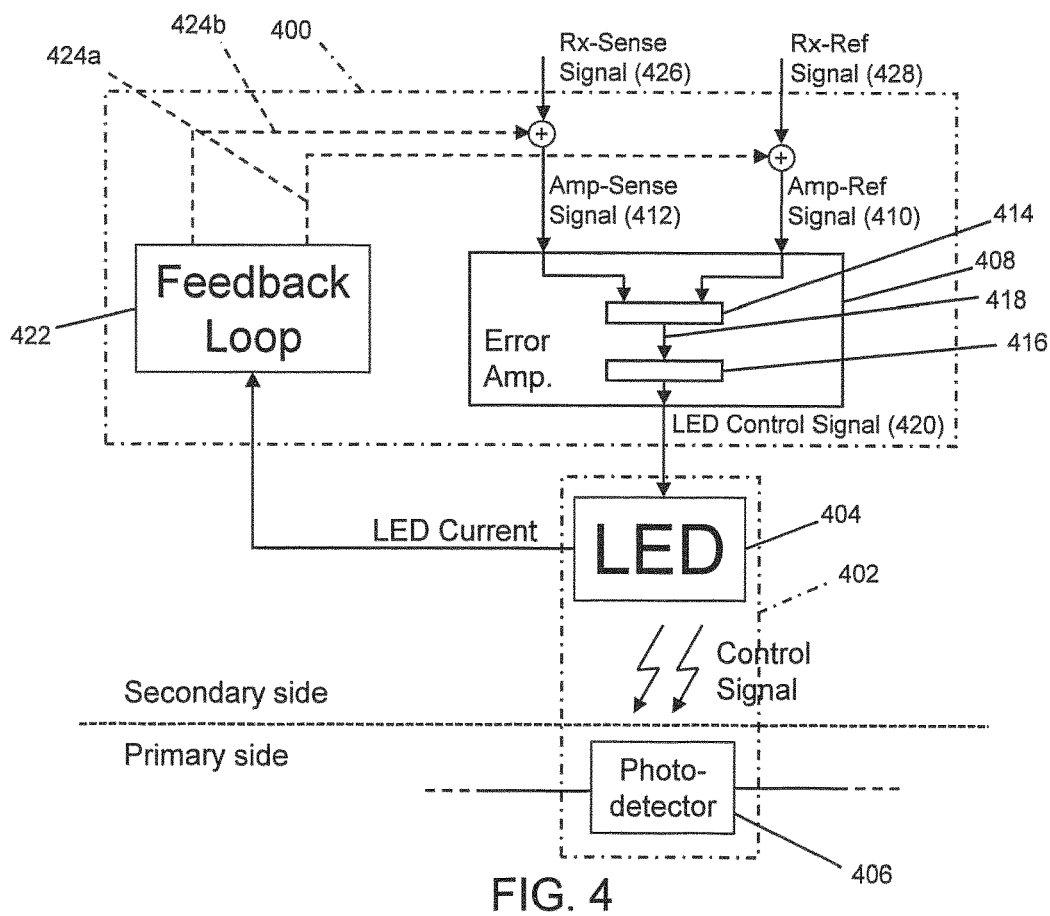
FIG. 4 shows schematically an example embodiment of a control arrangement for a SMPS.

FIG. 4 shows schematically an example embodiment of a control arrangement 400 for a switch mode power supply (SMPS). The switch mode power supply comprises an opto-coupler 402 having an LED 404 and a photodetector 406. The LED 404 is on the secondary side of the SMPS, and the photodetector 406 is on the primary side of the SMPS. The opto-coupler 402 is configured to transfer, from the secondary side to the primary side of the SMPS by means of an LED current, a control signal indicative of an error between an amplifier-reference-signal 410 and an amplifier-sensed-signal 412. The amplifier-sensed-signal 412 is indicative of an actual value of an output parameter of the SMPS, for example a proportion of an output voltage of the SMPS.

The control arrangement 400 includes an error amplifier 408. In this example, the error amplifier 408 includes a subtractor 414 that can generate an error signal 418, which represents the difference between the amplifier-reference-signal 410 and the amplifier-sensed-signal 412. The error amplifier 408 also includes an integrator 416 that integrates the error signal 418 and provides an LED control signal 420. As will be discussed below, the LED control signal 420 is used to control/determine the level of the current in the LED 404, which in turn is used at the primary side of the SMPS to set the output voltage of the SMPS.

The control arrangement 400 also includes a feedback loop 422 that is configured to modify the amplifier-reference-signal 410 or the amplifier-sensed-signal 412 in order to reduce the difference between these two signals, and thereby also reduce the error signal 418. In this way, the current through the LED 404 is reduced, and therefore the power consumed by the SMPS, especially in low power modes, is also reduced.

In this example, the feedback loop 422 is configured to modify the amplifier-reference-signal 410 or the amplifier-sensed-signal 412 based on the magnitude of the LED current (ILED). That is, the feedback loop 402 can reduce the error signal 418, which in turn sets the magnitude of the LED current, in accordance with the LED current. The feedback loop 402 can react either directly or indirectly on the LED current.

As shown in FIG. 4, the feedback loop 422 can add a reference-compensation-signal 424a to a received-reference signal 428 in order to provide the amplifier-reference-signal 410. The received-reference signal 428 may be representative of a desired output voltage of the SMPS (for example 2.5V), and the reference-compensation-signal 424a can be used to modulate this signal such that the current through the LED 404 is reduced.

As also shown in FIG. 4, a sensed-compensation-signal 424b can be added to a received-sensed-signal 426, in order to provide the amplifier-sensed-signal 412. The received-sensed-signal 426 may be representative of a sensed output voltage of the SMPS (for example a proportion of a voltage that is measured at the output of the SMPS), and the sensed-compensation-signal 424a can be used to modulate this signal such that the current through the LED 404 is reduced.

Adding such reference-compensation-signals 424a, 424b can be considered as adding an offset to a received signal.

Figure 5:
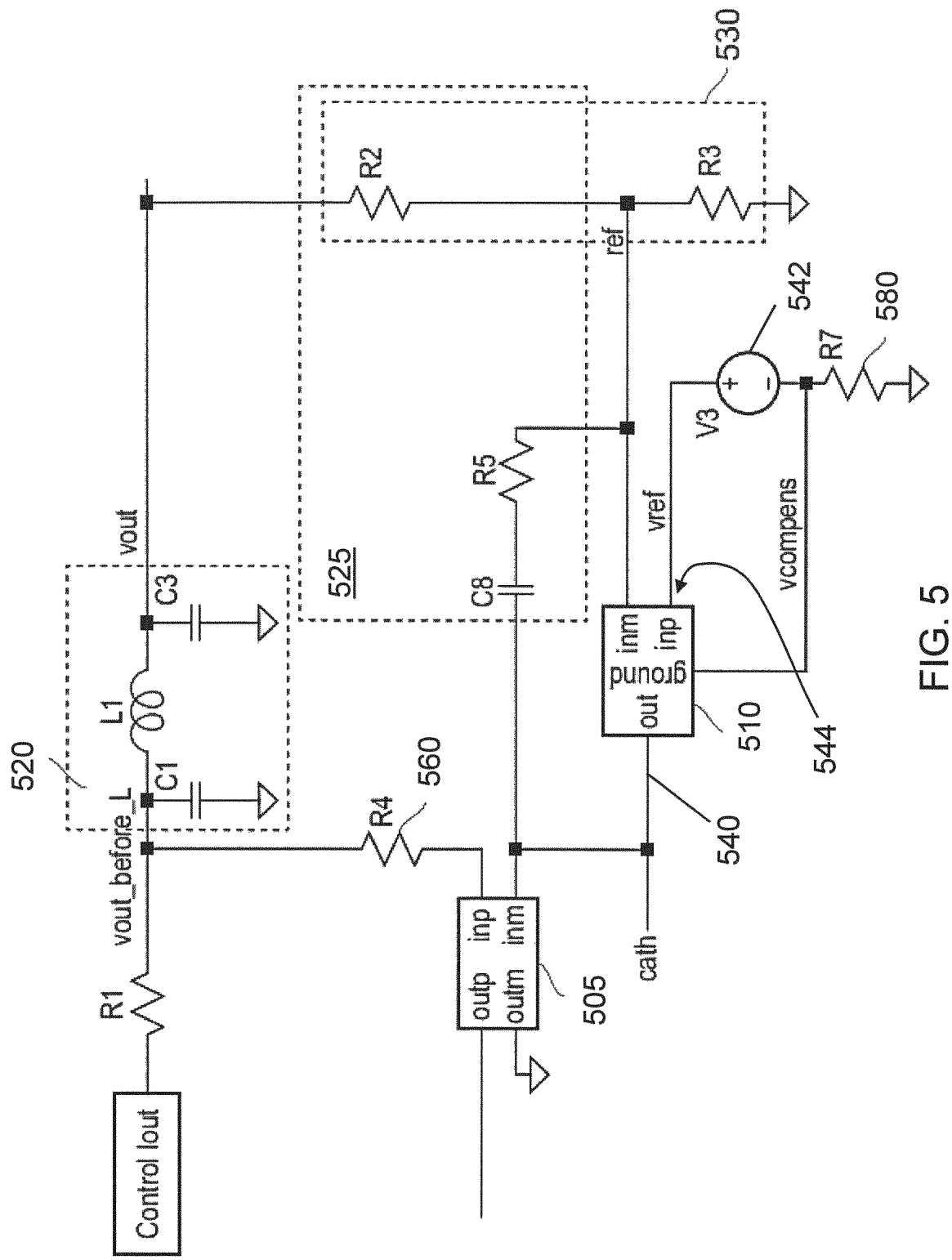
FIG. 5 shows an example of a circuit including a control arrangement for controlling a SMPS according to one or more embodiments in block diagram form.

FIG. 5 shows a control arrangement for a switch mode power supply operable in a burst mode. The power supply may also be operable in a normal mode which is not a burst mode. The power supply comprises an opto-coupler configured to transfer a control signal from a secondary side to a primary side of the switch mode power supply. The control signal is transferred by means of an LED current in the opto-coupler, and is associated with a time-varying error between a reference signal (which is an example of an amplifier-reference-signal) and a signal indicative of an actual value of an output parameter (which is an example of an amplifier-sensed-signal). The output parameter may be output voltage.

The control arrangement comprises an error amplifier configured to operate as a proportional-integrating error amplifier, which may, for instance, be an error amplifier such as a TL431 from NXP Semiconductors, configured to operate as a proportional-integrating error amplifier. The proportional-integrating error amplifier is configured to determine the LED current from the time-varying error. The control arrangement further comprises a feedback loop configured to adjust the magnitude of the LED current between bursts by modifying the time-dependant error. As already mentioned operation as a PI error amplifier does not preclude other functionality, and in particular the addition of differentiation may be possible.

As discussed above, absent such a control arrangement, the integrator of the proportional-integrating error amplifier can result in a large peak LED current between bursts. By modifying the time-dependant error, the LED current can be reduced or limited.

One way of achieving this is to detect, for instance by directly sensing, whether the switch mode power supply is operating in a burst mode and is in a state between bursts, and on detecting that the power supply is in such a state, to use the feedback loop to directly clamp or limit the LED current in the opto-coupler. It has already been shown above at 352 that the current may be truncated or limited; it may be possible to re-use such circuitry to limit or truncate the current to a much lower value between bursts. However, in such embodiments it is also necessary to determine whether the power supply is in fact between bursts, in order to know when to limit the LED current; this would require additional circuitry or complexity and thus result in additional cost for the device. The determination may be done in various ways, which will be immediately apparent to the skilled person. For instance, for power supplies which include a "burst-on" flag or signal, this may be monitored, and provided it is known that the power supply is operated in burst mode, the absence of a "burst-on" flag would indicate that the power supply is between bursts. In other embodiments a timer may be used: if Vout does not start to rise before the timeout period has elapsed, it may be deduced that the power supply is operating in a burst mode and is between bursts.

Figure 6A:
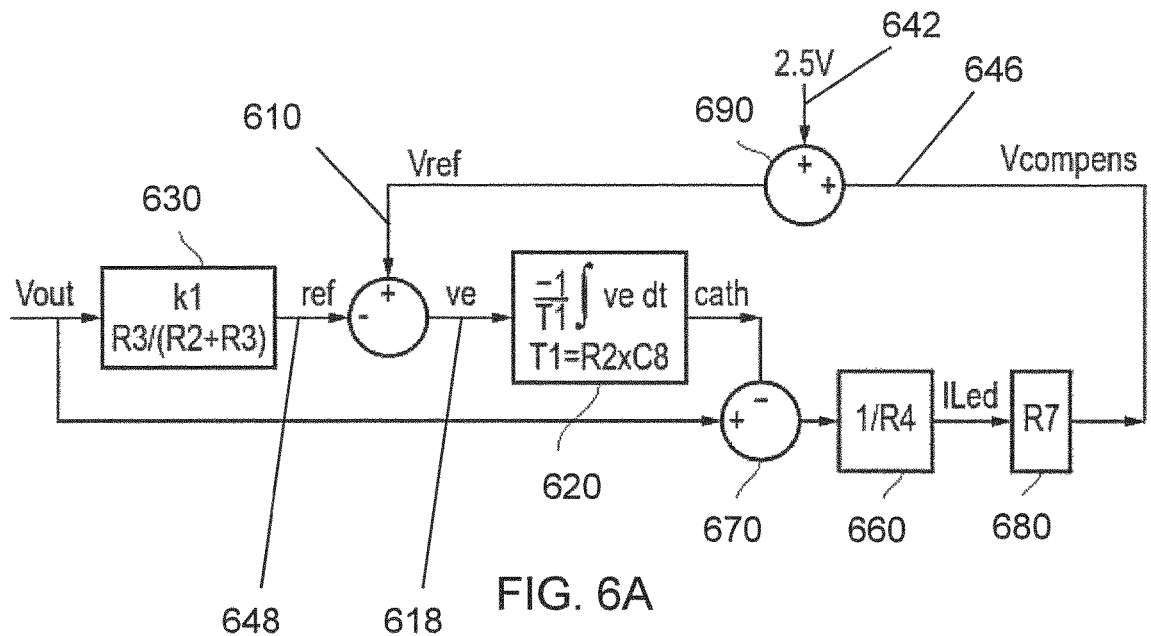
FIG. 6A shows, in functional block form, operation of the circuit of FIG. 4.

In one or more other embodiments, which will be described in more detail hereinbelow, the feedback loop is configured to modify the time-dependent error by adding a time-dependent offset to the reference signal. An example of such an embodiment is shown in FIG. 5, and in block diagram in FIG. 6A. FIG. 6A is similar to FIG. 2 but includes the feedback loop defined by resistor R7, 680, as will be described in more detail below.

FIG. 5 shows the error amplifier 510, such as TL431, which is configured to operate as a proportional integrating error amplifier by inclusion of integrator 525 defined through resistor R5 and capacitor C8. A fast lane, or proportional, resistor 560 is connected in series with the LED (source) side of opto-coupler 505. The error amplifier 510 is connected on the ground side of the opto-coupler. The ground connection of the error amplifier however, is not directly connected to ground, but instead resistor R7, shown at 580 in FIG. 5, is connected in the ground path, between the error amplifier and ground. The resistor R7 580 may also be referred to as a compensating-resistor. The error amplifier 510 also has a reference input terminal 544 that is connected to a first terminal of a reference-voltage-source 542. A second terminal of the reference-voltage-source 542 is connected to the ground connection 545 of the error amplifier 510.

The error amplifier 510 provides an LED control signal (cath) 540 that affects the current that flows through the LED part of the optocoupler 505. As shown in FIG. 1, the current that flows through the LED of the optocoupler 505 is the same as the current that flows into the error amplifier 510. Since the LED control signal (Vcath) 540 is provided with reference to ground, and since the ground terminal 545 of the error amplifier 510 is connected to ground via resistor R7, it will be appreciated that the voltage dropped across resistor R7 will depend upon the current flowing through the LED of the optocoupler 505. The voltage signal received at the reference input terminal 544 of the error amplifier 510 will therefore be the voltage provided by the reference-voltage-source 542 plus the voltage dropped across resistor R7 580. In this way, a feedback loop is provided that modifies the reference-signal that is provided to the reference input terminal 544 of the error amplifier 510, in order to reduce the current through the LED of the optocoupler 505.

In this way, a feedback from the opto coupler LED current to the reference voltage 542 for regulating the output voltage of the SMPS is realized by placing a resistor 580 in series with the ground line of the regulator (TL431). The proposed feedback occurs because the reference voltage of the TL431 is related to its ground terminal 544. By lifting up the ground due to a voltage drop across the proposed resistor 580, the reference voltage is effectively increased, reducing Vout−Voutref.

The circuit includes a filter network 520 to smooth the output voltage Vout. Vout is scaled by a resistive divider 530, and the scaled version supplied to the error amplifier 510.

The operation of the circuit as shown in FIG. 5 will now be described with reference to FIG. 6A, which shows relevant parts of the circuit in block form. As already described, this circuit is similar to that shown in FIG. 2 with the addition of the resistor R7 680, which converts the LED current ILED into a voltage Vcompens 646 (which is an example of a reference-compensation signal). In contrast to the circuit shown in FIG. 2, the amplifier-reference-signal (Vref) 610 that is provided to the error amplifier is no longer directly equal to the preset reference level 642, as defined by a received-reference-signal of 2.5V in FIG. 6A. Instead, Vcompens 646 forms a time-dependent offset to the preset reference level 642, to result in the amplifier-reference-signal 610 (Vref). The offset is added in adder 690. The resulting amplifier-reference-signal 610 (Vref) is compared with the amplifier-sensed-signal (ref) 648 indicative of an actual value of the output voltage. In this embodiment, the amplifier-sensed-signal 648 indicative of an actual value of the output voltage is a scaled version of Vout, being scaled by a factor k1, defined by the resistive divider formed by resistors R2 and R3.

Figure 7:
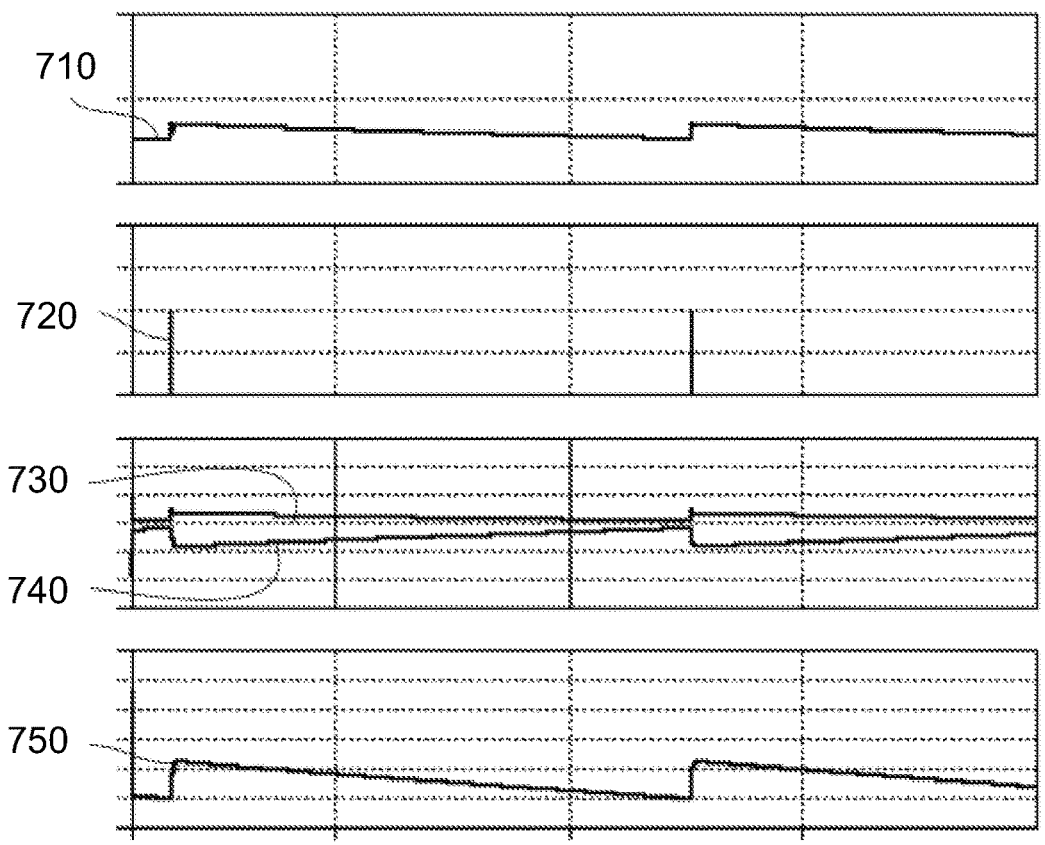
FIG. 7 shows various waveforms associated with FIG. 4.

Various waveforms associated with the circuit of FIGS. 5 and 6A are shown in FIG. 7. Similar to those shown in FIG. 3, the figure shows the curve for the amplifier-reference-signal Vref at 710; the second curve shows periodic individual bursts 720 (corresponding to a control signal "burst-on"); the third curve 730 shows the output voltage Vout of the SMPS; curve 740 shows a voltage Vcath at the output of the error amplifier and finally curve 750 shows the current ILED in the opto-coupler LED.

As can be seen from curve 710, the voltage at node Vref is now not fixed anymore, but follows the triangle voltage shape of Vout (shown at 730), due to the additional feedback signal injected. As a result, the voltage Vcath at 740, has now changed from a parabolic shape to a triangular shape with a much smaller peak value compared to that shown in FIG. 3. Therefore the current in the opto-coupler has significantly reduced, relative to that shown in FIG. 3. Using the same example described above with reference to FIG. 3, the additional power consumption is now only 80 µA×20V at the primary side and 450 µA×12V at the secondary side. The total power lost is then only 6.4 mw, which is a factor of 4 lower than the loss (24 mW) associated with the circuit shown in FIG. 2.

Figure 6B:
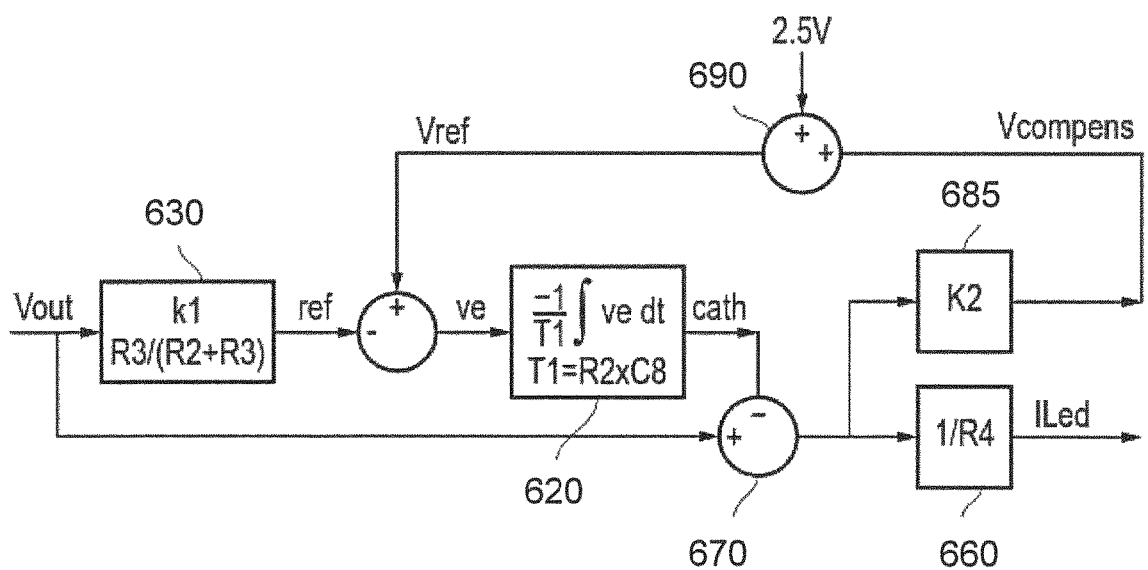
FIG. 6B shows, in functional block form, operation of a similar circuit.

A variation of the circuit is shown, in functional block form, in FIG. 6B. This circuit is similar to that shown in FIG. 6A, except that the feedback loop is not taken from the ILED current, but from the voltage at (vout−cath). This voltage is scaled by a factor k2 to provide the signal Vcompens.

Then:

$$V\text{compens}=k2\times(V\text{out}-\text{cath}).$$

The compensation voltage Vcompens still acts to adjust the magnitude of the LED current between bursts, by modifying the time-dependant error, and in particular by adding a time-dependant offset to a received-reference-signal.

In order to determine by how much to modify the time-dependent error, in order to provide an optimal solution, and in particular with reference to the embodiment just described to choose the value of R7 to provide the time-dependent offset to the reference signal, the following calculation that may be carried out:

First, note that $$ve = k1 \cdot V\text{out} - V\text{compens} \tag{1}$$

and that $$v\text{compens} = \frac{R7}{R4} \cdot (V\text{out} - V\text{cath}). \tag{2}$$

Defining an integrating time T1 by T1=R2·C8 (neglecting R5), then $$V_{cath} = \frac{-1}{s \cdot T1} \cdot (ve) \quad (3)$$

$$I_{LED} = \frac{Vout - Vcath}{R4} = \frac{vcompens}{R7} \quad (4)$$

So $$\frac{I_{LED}}{Vout} = \frac{\left(1 + \frac{T1}{k1} \cdot s\right) \cdot k1}{\left(1 + \frac{R4}{R7} \cdot T1 \cdot s\right) \cdot R7}. \quad (5)$$

Then defining two frequencies F1, F2, by:

$$F1 = \frac{1}{2\pi} \cdot \frac{k1}{T1} \quad (6)$$

and $$F2 = \frac{1}{2\pi} \cdot \frac{R7}{T1 \cdot R4}, \quad (7)$$

results in, for Frequencies <F1, F2:

$$\frac{I_{LED}}{Vout} = \frac{k1}{R7}. \quad (8)$$

And, for frequencies >F1,F2:

$$\frac{I_{LED}}{Vout} = \frac{1}{R4}. \quad (9)$$

These calculations show that for frequencies in the order of magnitude of the loop bandwidth the gain—from Vout to ILED—is 1/R4, which is the same gain (fast lane) as without the current feedback. For lower frequencies, corresponding to a burst frequency, the gain from Vout to LED current is k1/R7. This allows setting the opto-coupler peak current by choosing an appropriate value for the feedback by R7, since the ratio between ripple voltage at the output and opto-coupler current is now set by R7. The result is that the parabolic shape is replaced by a triangular shape whose amplitude does not depend on the burst frequency any more. This may allow for a very low burst frequency and may allow optimizing the converted power during the burst on interval to meet optimum efficiency setting. A typical value of R7 may be between 10Ω and 50Ω: in a particular example a value of 20Ω was found to be effective.

In one of more embodiments, the burst mode has a repetition period which is longer than 50 ms, and frequency which is less than 20 Hz: typically for audible noise reasons a burst-mode frequency is somewhere below 1-2 kHz. At the specific case of no load, the repetition frequency may be much lower, and may even be less than 25 Hz. Of course, it will be appreciated that the burst on time cannot be shorter than 1 switching cycle. For efficiency reasons, the power during that 1 switching cycle (with Tper of approximately 50 μsec) will generally be kept at a relatively high level, for example 10% of the full load level. The full load level could, in a typical application, be over the order of 300 Watt. At no load, the power required is typically of the order of 50 mWatt, so a duty-cycle will be:

50 mW/(300 W*10%)=1.7×10⁻³.

Taking as an example a 50 μsec period time of the switching cycle this gives burst-period, or burst repetition time of: 50 μs/1.7×10⁻³=30 msec.

Figure 8:
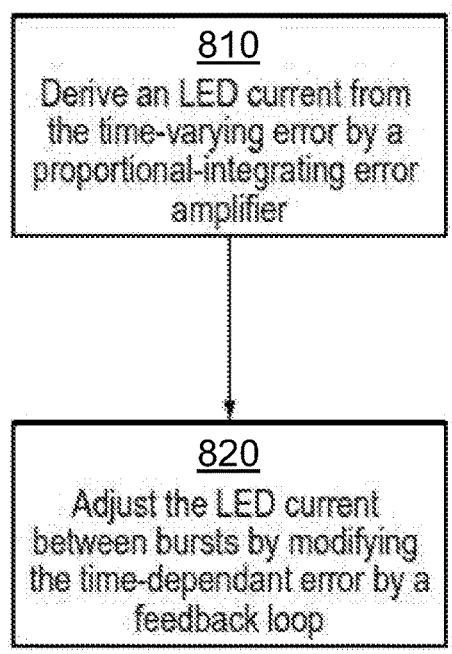
FIG. 8 shows a method according to one or more embodiments.

FIG. 8 shows a flowchart according to one or more embodiments. In particular, the flowchart of FIG. 8 shows a method of controlling a switch mode power supply operable in a burst mode and comprising an opto-coupler configured to transfer, from a secondary side to a primary side of the switch mode power supply by means of an LED current, a control signal indicative of a time-varying error between a reference signal and a signal indicative of an actual value of an output parameter. The method comprises, in step 810 deriving an LED current from the time-varying error by a proportional-integrating error amplifier; and in step 820, adjusting the magnitude of the LED current between bursts by modifying the time-dependant error by a feedback loop.

Figure 9A:
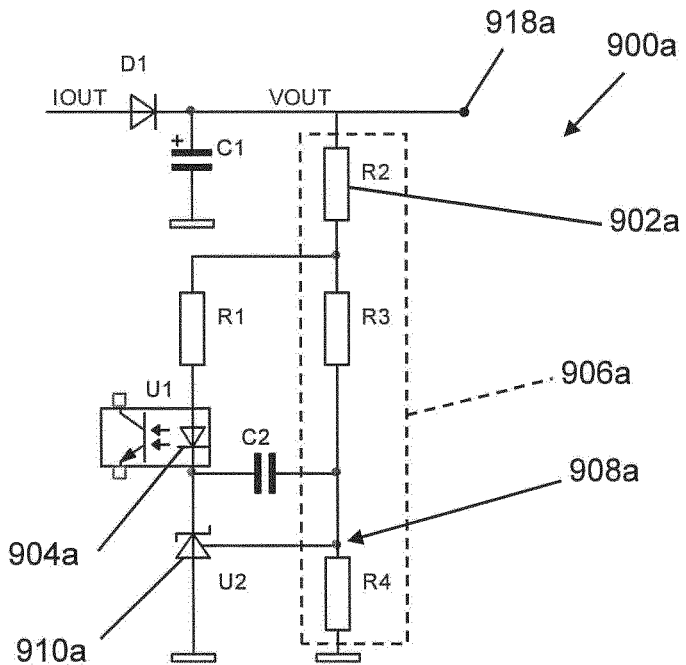
FIGS. 9A, 9B and 9C shows schematically other example embodiments of a control arrangement for a SMPS.

FIG. 9A shows schematically another example embodiment of a control arrangement 900a for a SMPS. In this example, a compensating-resistor/feedback-resistor 902a in included, which effectively adds a compensation signal to a received-sensed-signal. As with the example discussed above with reference to FIGS. 5 and 6A, and as discussed in more detail below, the current through the compensating-resistor 902a depends upon the current through an LED 904a of an optocoupler (ILED). Therefore, the voltage dropped across the compensating-resistor 902a depends upon ILED, and the voltage dropped across the compensating-resistor 902a affects an amplifier-sensed-signal that is provided to an error amplifier 910a.

In FIG. 9A, three resistors R2, R3, R4 are connected in series between the output terminal 918a of the SMPS and ground. Resistor R2 can be considered as the compensating-resistor 902a. The three resistors R2, R3, R4 define a resistive divider 906a. A sensed-node 908 is defined between resistors R3 and R4, which provides an amplified-sensed-signal to the error amplifier 910a.

Connected in parallel with a subset of the resistors in the resistive divider 906a is the LED 904a of the optocoupler. In this example the LED 904a and the error amplifier 910a are connected in series with each other, and the series combination of the LED 904a and the error amplifier 910a is provided in parallel with resistors R3 and R4 of the resistive divider 906a.

When no current is flowing through the LED, the voltage of the amplified-sensed-signal at the sensed-node 908a is defined by the resistive divider 906a as:

$$V_{sense} = V_{out} * \left(\frac{R4}{R2 + R3 + R4}\right)$$

This can also be considered as a received-sensed-signal because it is purely representative of the output voltage of the SMPS.

Now, if a current (ILED) is flowing through the LED 904a, this current will also flow through the compensating-resistor 902a, which will increase the voltage dropped across the compensating-resistor 902a, and therefore reduce the voltage signal at the sensed-node 908a. This can be considered as the amplified-sensed-signal (at sensed-node 908) being a modified version of a received-sensed-signal, because a compensation-signal (the voltage dropped across the compensating-resistor 902a due to ILED) has been added to the received-sensed-signal (the voltage at the sensed-node 908 due to the current flowing through the resistive divider 906a from the output terminal 918a of the SMPS). In the same way as discussed above, use of such a compensation-signal can reduce the error signal that is determined by the error amplifier 910a, and therefore can reduce the current flowing through the LED 904a.

The example of FIG. 9A can locally apply feedback to the control loop error amplifier of the SMPS output in order to reduce the power consumption for low load and improve repetitive load step transient response by limiting the current in the optocoupler LED 904a.

In case of burst mode or transients, the output voltage Vout can be above the set point, the optocoupler LED current will increase until Vout drops below its set point. In the circuit diagram of FIG. 9A, a 3 pin error amplifier 910a is used. The optocoupler LED current is fed back to the reference voltage by means of the feedback resistor R2 902a in the output voltage divider 906a. The optocoupler LED current creates a voltage across the feedback resistor 902a, and as a result the error amplifier 910a will reduce the optocoupler LED current (local feedback).

Figures 9B, 9C:
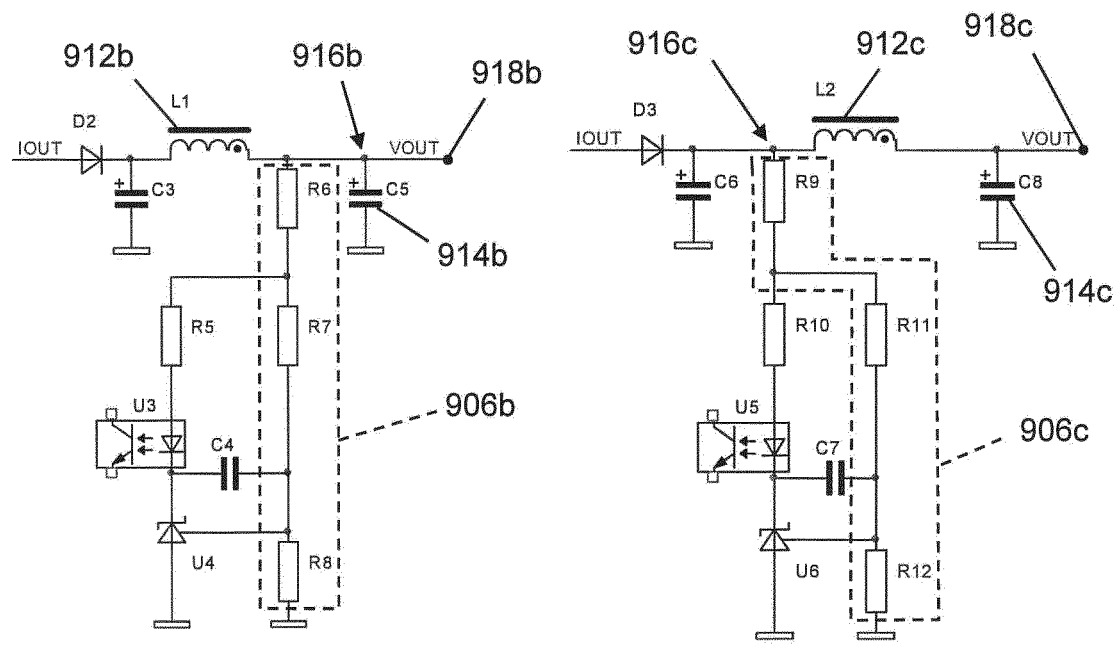

FIGS. 9B and 9C show schematically further example embodiments of a control arrangement 900b, 900c for a SMPS. Features of FIGS. 9B and 9C that have already been described with reference to FIG. 9A will not necessarily be described again here.

In FIGS. 9B and 9C, an LC network is provided at the output of the SMPS in order to reduce the ripple in the voltage at the output terminal 918b, 918c of the SMPS. The LC network includes a smoothing-inductor 912b, 912c and a smoothing-capacitor 914b, 914c. In both examples, the smoothing-capacitor 914b, 914c is connected between the output terminal 918b, 918c of the SMPS and ground.

As shown in FIG. 9B, the resistive divider 906b is connected to the output of the SMPS at a feedback-node 916b. In FIG. 9B, the smoothing-inductor 912b is connected in series between the feedback-node 916b and the upstream components of the SMPS (not shown in FIG. 9B).

As shown in FIG. 9C, the smoothing-inductor 912c is connected in series between the feedback-node 916b and the output terminal 918c of the SMPS.

Figure 10A:
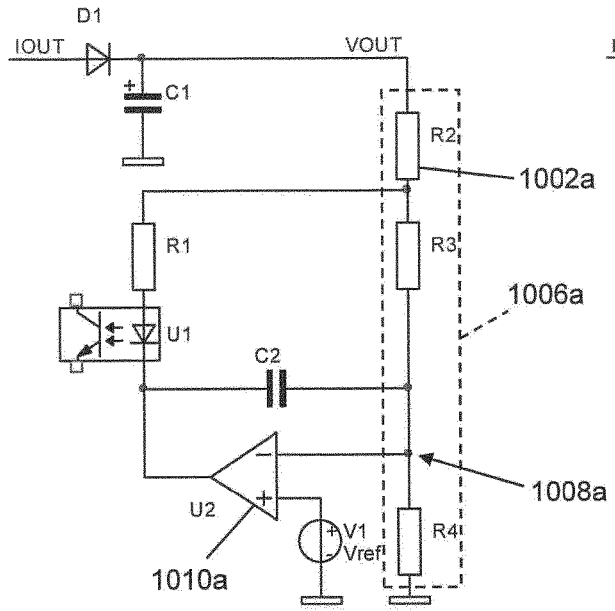
FIGS. 10A and 10B illustrate further example embodiments of a control arrangement for a SMPS.
Figure 10B:
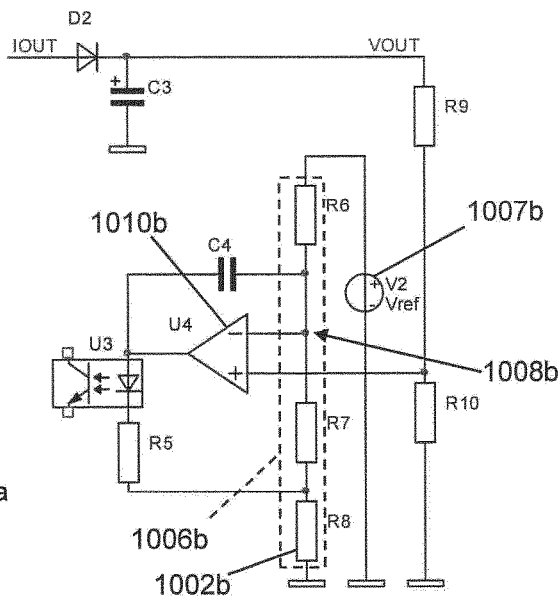

FIGS. 10A and 10B illustrate further example embodiments of a control arrangement for a SMPS. These figures illustrate how the control arrangement can be implemented with error amplifiers other than 3-pin amplifiers such as a TL 431.

FIG. 10A includes an operational amplifier (opamp) 1010a as the error amplifier. In a similar way to the circuit of FIG. 9A, the control arrangement includes a resistive divider 1006a that provides an amplified-sensed-signal at a sensed-node 1008a. The resistive divider 1006a includes a compensating-resistor 1002a that also passes the LED current, and therefore drops a voltage that varies with the level of the LED current. In this example, the compensating-resistor 1002a is connected to the output terminal of the SMPS.

In other examples, the operational amplifier (opamp) 1010a of FIG. 10A can instead be provided as an operational transconductance amplifier (OTA). In some examples, the feedback network can be connected slightly differently when an OTA is used, as will be appreciated by the skilled person.

FIG. 10B also includes an operational amplifier (opamp) 1010b as the error amplifier. In this example, a resistive divider 1006b is provided in series with a reference voltage source 1007b, and provides an amplified-reference-signal at a reference-node 1008b. The resistive divider 1006b includes a compensating-resistor 1002b that passes the LED current, and therefore also drops a voltage that varies with the level of the LED current. In this example, the compensating-resistor 1002b is connected to ground.

Figure 11:
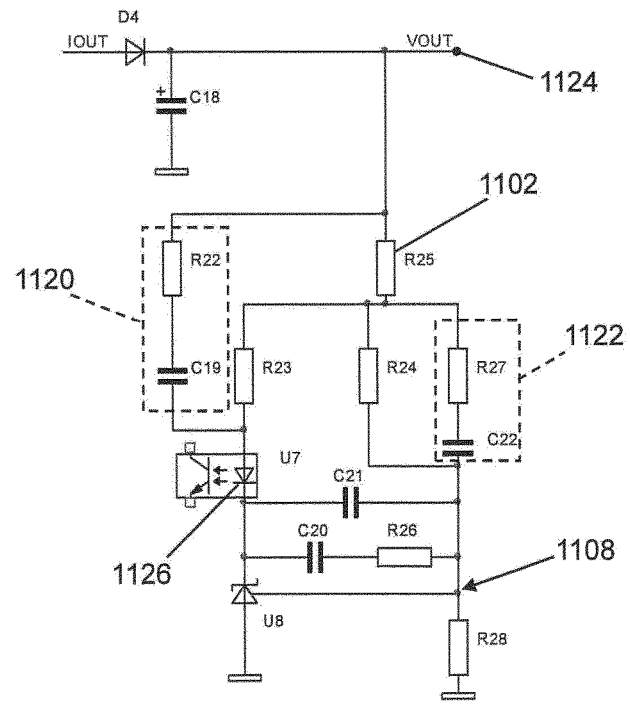
FIG. 11 illustrates an example embodiment of a control arrangement that shows two possible ways of implementing differential error compensation.

It will be appreciated that differential error compensation and additional proportional error compensation can also be included in one or more of the compensation networks disclosed in this document. FIG. 11 illustrates an example embodiment of a control arrangement that shows two possible ways of implementing differential error compensation. Features of FIG. 11 that have already been described with reference to earlier figures will not necessarily be described again here.

A first-differential-RC-block 1120, suitable for providing differential compensation is connected in series between a first terminal of the compensating-resistor 1102 (which is also connected to the output terminal 1124 of the SMPS) and the LED 1126. A second-differential-RC-block 1122 is connected between a second terminal of the compensating-resistor 1102 and the sensed-node 1108. The control arrangement need not necessarily include both blocks. The two separate differential-RC-blocks 1120, 1122 are shown in order to illustrate how it can be connected to either end of the newly added compensating-resistor 1102.

Examples disclosed above relate to a SMPS with current feedback in regulator for low load input, which can offer a solution for an overshoot in the optocoupler current that causes an undesired increase of the power consumption at no load. The solution can allow setting a high power during a burst on interval, while preventing a parabolic shape in the LED current and thereby avoiding a high peak current. This can allow for long burst repetition period without having a large opto coupler current. In this way the contribution of the opto coupler current to the no load input power can be significantly reduced.

Another issue that is caused by the same overshoot in the optocoupler current can occur when a load step is made from high load to no load, and then back to high load. At the changeover to no load, the regulation loop can take some time to reduce the delivered power to 0. This results in an overshoot at Vout that cannot be reduced, because the energy stored in the output capacitor cannot be consumed when there is no load. As the overshoot may only be small, it can be no significant issue. However, the error amplifier of the feedback loop continues to integrate this overshoot, and this can result in the optocoupler current increasing to large values. When the load returns, the feedback loop can take time to integrate back to the normal optocoupler current level before the delivered power can be increased. This can result in a significant undershoot. As the examples disclosed above can prevent or reduce the integrator from further integration in between bursts when the optocoupler current reaches a certain level, they can also advantageously take less time to integrate back following a load step, so therefore resulting in a smaller undershoot. Therefore, advantages of one or more of the circuits disclosed herein are not limited to SMPSs that operate in a burst mode.

In some applications, a potential disadvantage with one or more of the above examples is that the additional feedback based on the optocoupler current is also present during normal steady state operation, therefore can give an error on the output voltage. Although in some applications this error may be sufficiently small that it is considered acceptable, we describe below various options for reducing the error during normal steady state operation. For example, the feedback loop can reduce a degree of modification to an amplifier-reference-signal or an amplifier-sensed-signal (ref) during normal operation.

As will be discussed below, the feedback can be made dependent on the optocoupler current such that no or only small additional feedback (based in ILED) occurs during steady state operation, while the desired additional feedback occurs at optocoupler current levels during overshoot or no load condition. In this way, feedback based on a property of the error signal (Vout-Voutref) and the reference voltage of the regulator (Voutref) can be provided as discussed above, and furthermore the feedback can dependant on the value of the optocoupler current.

Referring to FIGS. 5 and 6A, this additional functionality can be provided by implementing the compensating-resistor R7 580, 680 as a non-linear resistor, such as a current depending resistor.

Figure 12:
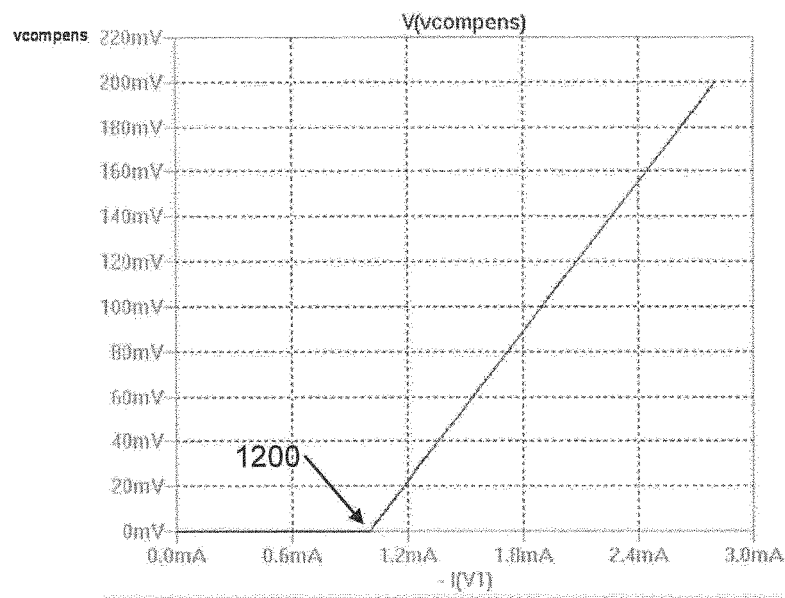
FIG. 12 shows example characteristics of a non-linear resistor that can be used as any compensating-resistor disclosed herein.

FIG. 12 shows example characteristics of a non-linear resistor that can be used as any compensating-resistor disclosed herein. Current through the component is shown on the horizontal axis. Voltage across the component is shown on the vertical axis. The voltage level on the vertical axis can be considered as the level of a compensation-signal provided by the compensation-resistor, which is set based upon the current through the LED, as shown on the horizontal axis.

When the SMPS is operating in a normal steady state mode of operation, the LED current can typically be lower than when the SMPS is operating in a burst mode of operation. As shown in FIG. 12, the non-linear resistor drops only a small voltage when the current has a low value, and the SMPS is within a normal steady state region. Outside this region, for higher current values, the non-linear resistor drops a higher voltage. Therefore, in the normal steady state region, the non-linear resistor generates a compensation-signal that has little or no effect on a received-reference-signal or a received-sensed-signal.

More specifically, in the example of FIG. 12, for currents below 1 mA, the voltage drop across the component is very small. For currents above 1 mA, the non-linear component behaves as a 100 ohm resistor, therefore giving the desired feedback to: adapt the effective reference voltage of the error amplifier; or to adapt an effective sensed output value. In this example, therefore, the non-linear resistor can be said to have a threshold-current-level of 1 mA, above which the non-linear resistor performs as a linear resistor, and below which the non-linear resistor performs as a short circuit. The threshold-current-level is identified with reference 1200 in FIG. 12.

Figure 13:
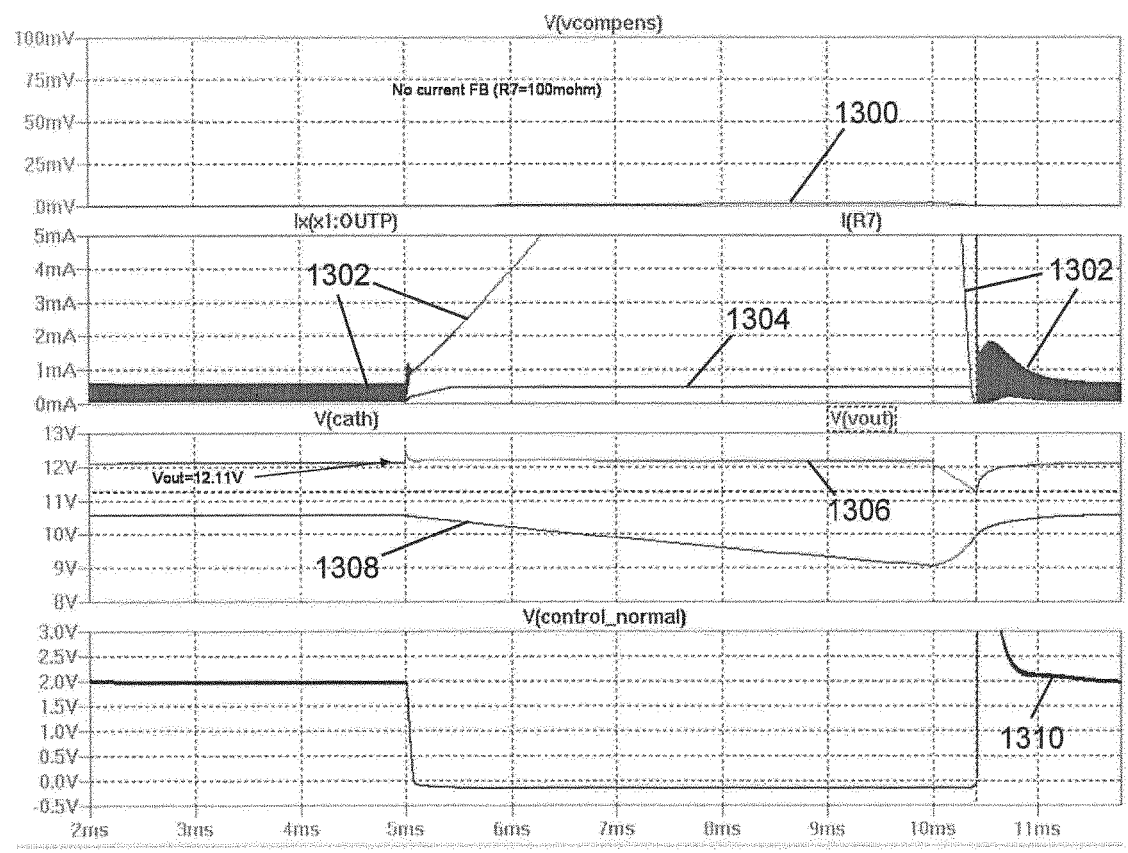
FIG. 13 illustrates example waveforms in a circuit such as the one of FIG. 1.

FIG. 13 illustrates example waveforms in a circuit such as the one of FIG. 1, which does not include an additional feedback loop for reducing an error between an amplifier-reference signal and an amplifier-sensed-signal. Time is shown on the horizontal axis.

The first plot of FIG. 13 shows a compensation-signal 1300 of zero because there is no additional feedback in this example. The second plot of FIG. 13 shows optocoupler LED current (ILED) 1302, and also the current through the photodetector of the optocoupler 1304. The third plot shows the output voltage (Vout) 1306 of the SMPS, and also the LED control signal (Vcath) 1308 that is provided by the error amplifier. The fourth plot shows a primary-side control signal (Vcontrol_normal) 1310 that is used, indirectly, to control operation of a primary-side power switch of the SMPS. Vcontrol_normal 1310 can be considered as a signal that represents the power delivered by the SMPS.

For the simulation of FIG. 13, the SMPS is operating in a normal steady state mode of operation up until 5 ms. Then at 5 ms, the load is removed or reduced. At 10 ms, the load is reconnected.

FIG. 13 shows that a significant undershoot of Vout 1306 occurs with respect to the regulated value of 12.11V, when the load is reconnected at 10 ms. This is due to the voltage Vcath 1308 integrating down. At the moment the load returns (t=10 ms) it takes approximately 400 us before the difference between Vcath 1308 and Vout 1306 has reduced to a level for defining an appropriate level of optocoupler current ILED 1302 that allows an increase in the output power of the SMPS. During this 400 usec, Vout drops almost one volt, which can be unacceptable in some applications that require a maximum of 5% undershoot.

FIGS. 14 to 17 and 19 to 20 show the same waveforms as FIG. 13, with corresponding reference numbers.

Figure 14:
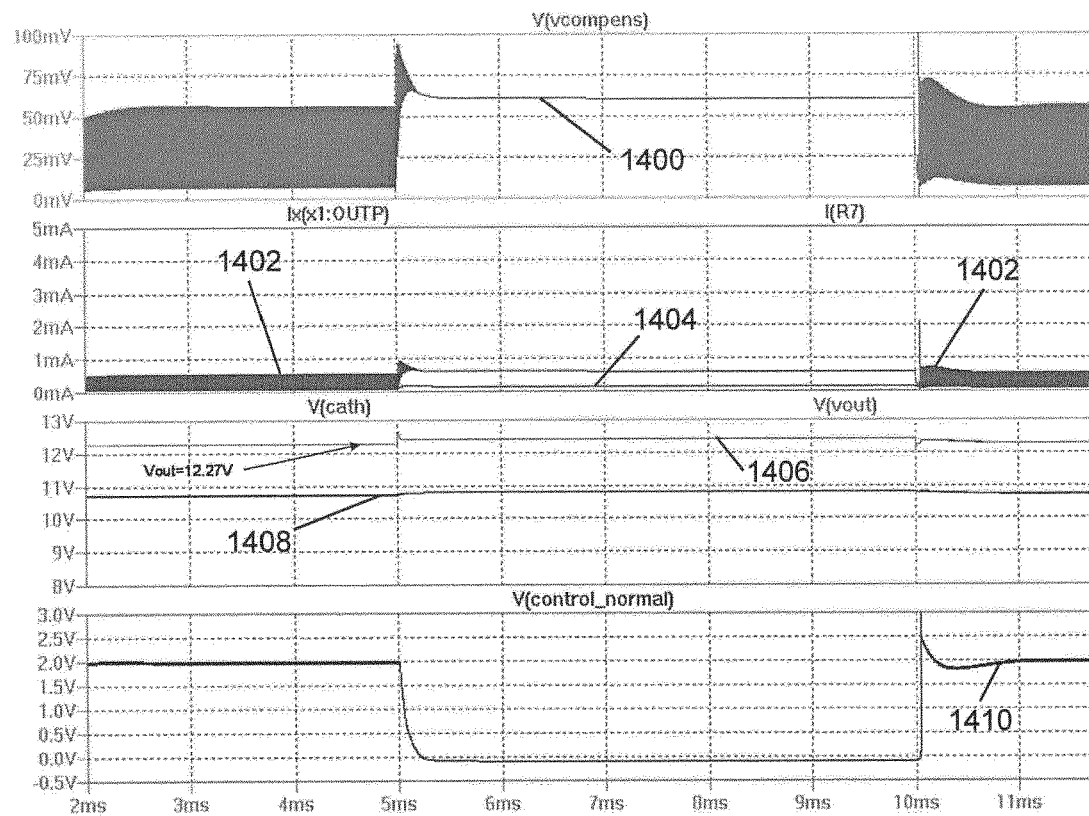
FIGS. 14 to 17 illustrate further example waveforms of other circuits.

FIG. 14 illustrates example waveforms in a circuit such as the one of FIG. 5, which includes an additional feedback loop for providing a compensation-signal for reducing an error between an amplifier-reference signal and an amplifier-sensed-signal. The compensation-signal is provided by a linear/fixed compensating-resistor in this example.

FIG. 14 shows that the integrating effect of Vcath 1408 is prevented/reduced between 5 ms and 10 ms due to the reference being increased by the current feedback. However, during normal operation (up until 5 ms) the regulated value of the output voltage (Vout) 1406 is now 12.27V which is 1.3% above the desired value.

Figure 15:
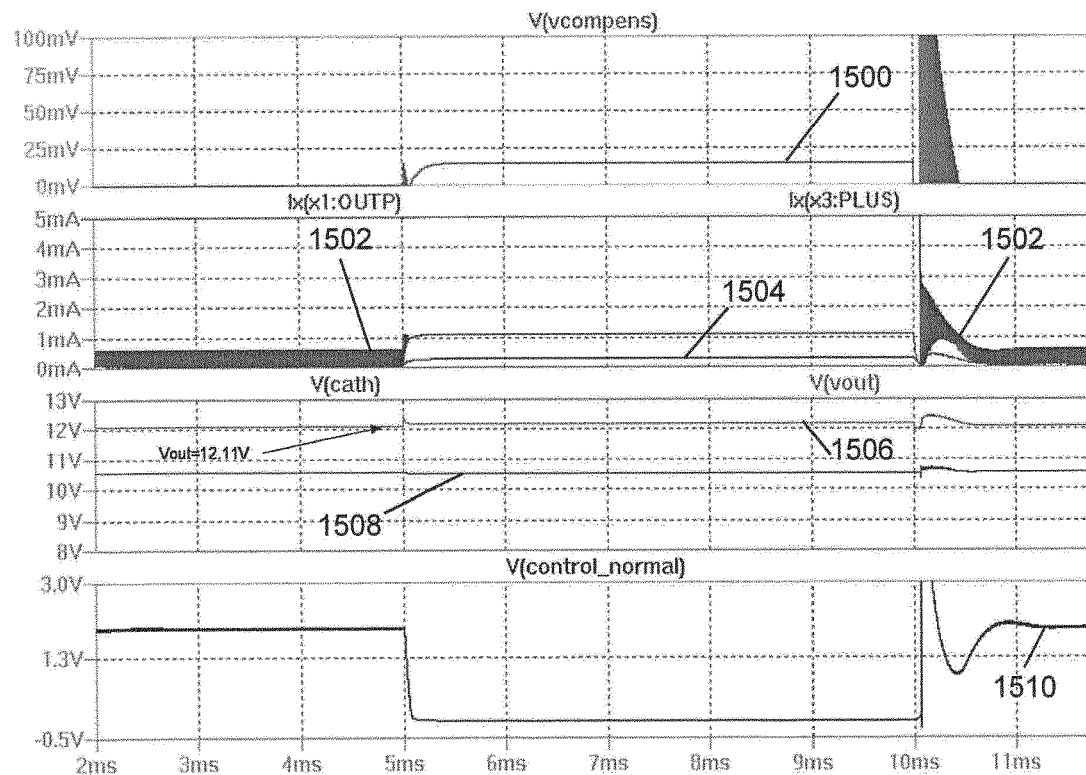

FIG. 15 illustrates example waveforms in a circuit such as the one of FIG. 5, but this time with the compensation-signal provided by a non-linear compensating-resistor such as the one illustrated operationally in FIG. 12.

During normal steady state operation before 5 ms, Vout 1506 has its desired value of 12.11V, which is the same value shown in FIG. 13 for the circuit without the additional feedback. Also, after the load step in FIG. 15, the integration of Vcath 1508 is advantageously prevented/reduced in the same way as FIG. 14. Therefore the undershoot of Vout 1506 is also prevented/reduced when the load returns at 10 ms.

Optocouplers have a CTR (current transfer ratio), which affects the level of the current that should be passed through the optocoupler LED to achieve the required control at the primary side of the SMPS. The CTR of an optocoupler has a tolerance and will change over the lifetime of the optocoupler. It will also result in an undesirable increase in the tolerance at the output voltage.

Figure 16:
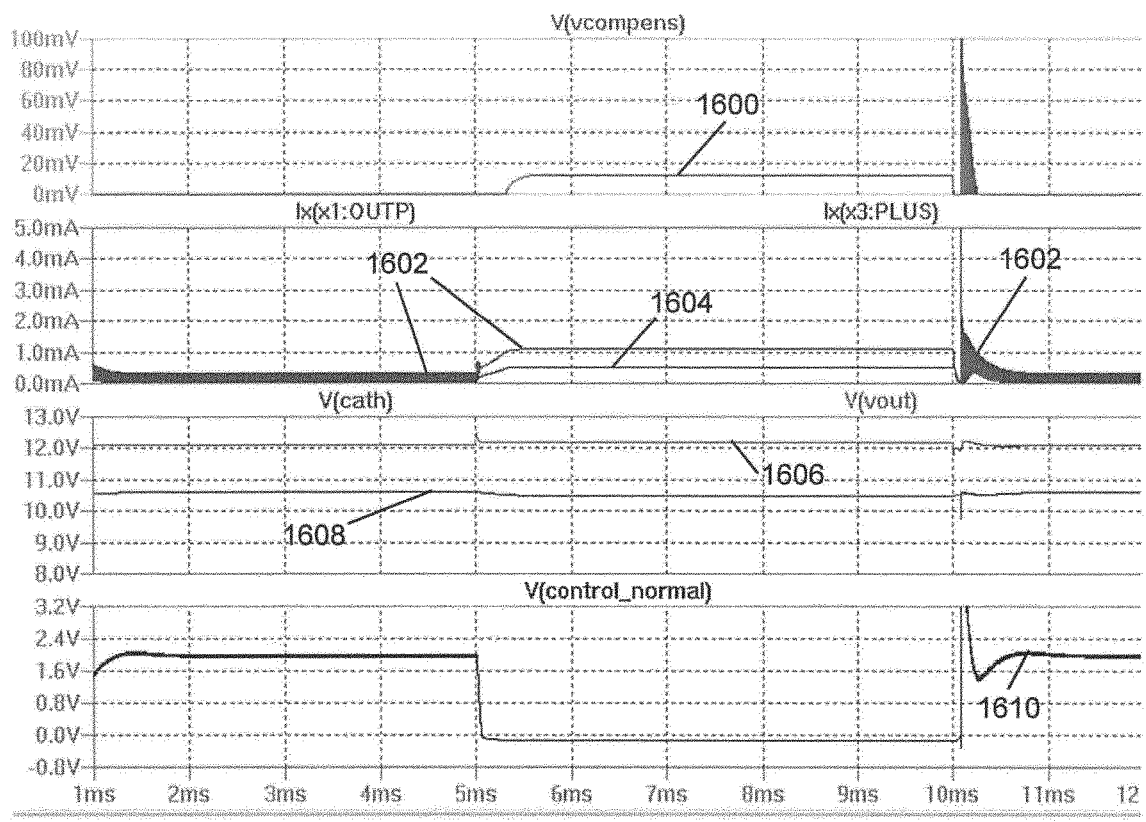

FIG. 16 illustrates example waveforms of the same circuit that was used for FIG. 15 (with a non-linear compensation-resistor), and represents a simulation with the CTR of the optocoupler increased to its worst case maximum (a factor 2 higher, which is 0.5 in this example).

FIG. 16 shows that with the maximum CTR, during the normal mode of operation before 5 ms, the opto current at the secondary side 1602 is lower than at nominal CTR. The result is that Vcath 1608 has to integrate more downwards in order to build up sufficient current to get Vref to effectively match Vout 1606 such that the integrating process stops. This also means that it takes slightly longer to get back to the normal power level after the load has returned at 10 ms, although in FIG. 16 this delay is minimal.

Figure 17:
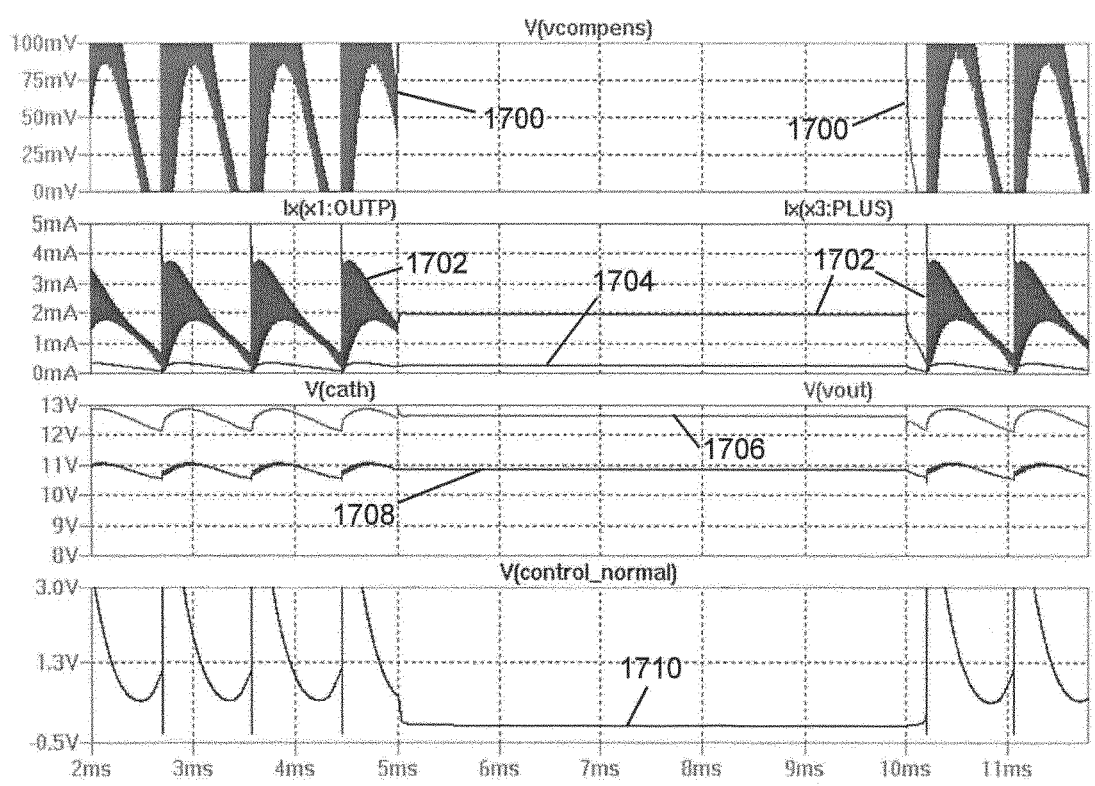

FIG. 17 illustrates example waveforms of the same circuit that was used for FIG. 15 (with a non-linear compensation-resistor), and represents a simulation with the CTR of the optocoupler increased to its worst case minimum (a factor 2 lower, which is 0.125 in this example).

FIG. 17 shows that, at very low CTR, the required optocurrent at the secondary side 1702 during the normal mode of operation, before 5 ms, comes very close to the threshold-current-level of the non-linear resistor. As shown in FIG. 12, the threshold-current-level is 1 mA in this example. This causes the current feedback to begin during normal mode of operation and results in an instable loop. This problem can be addressed by increasing the threshold-current-level level of the non-linear resistor, which defines where the feedback begins, for example to 2 mA.

Figure 18:
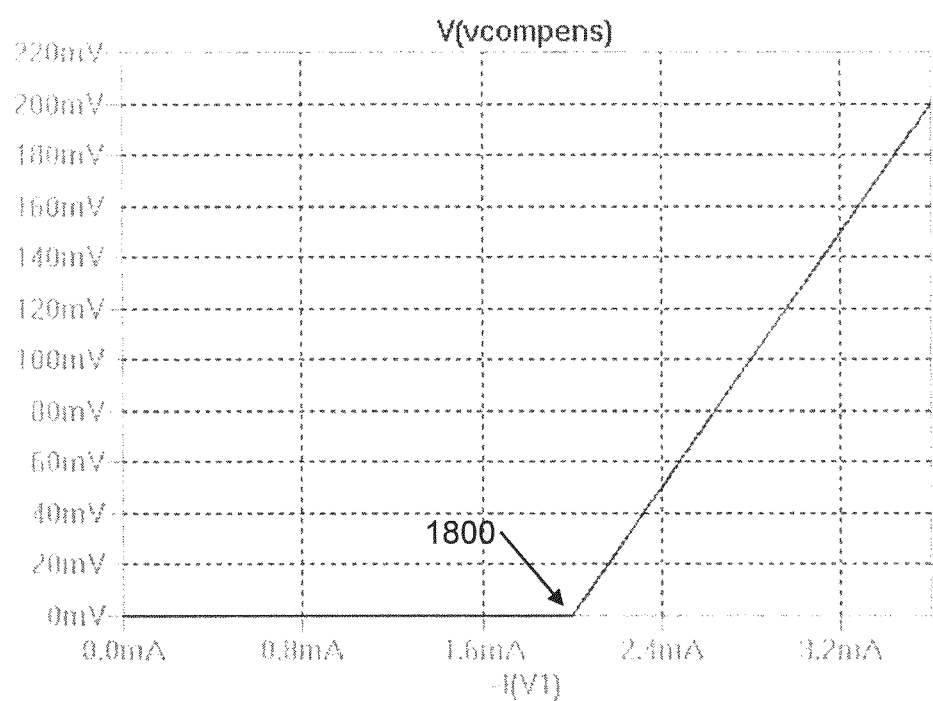
FIG. 18 shows another example of characteristics of a non-linear resistor that can be used as a compensating-resistor.

FIG. 18 shows another example of characteristics of a non-linear resistor that can be used as a compensating-resistor. When compared to the characteristics of FIG. 12, it can be seen that the threshold-current-level 1800 of FIG. 18 has been increased from 1 mA to 2 mA.

Figure 19:
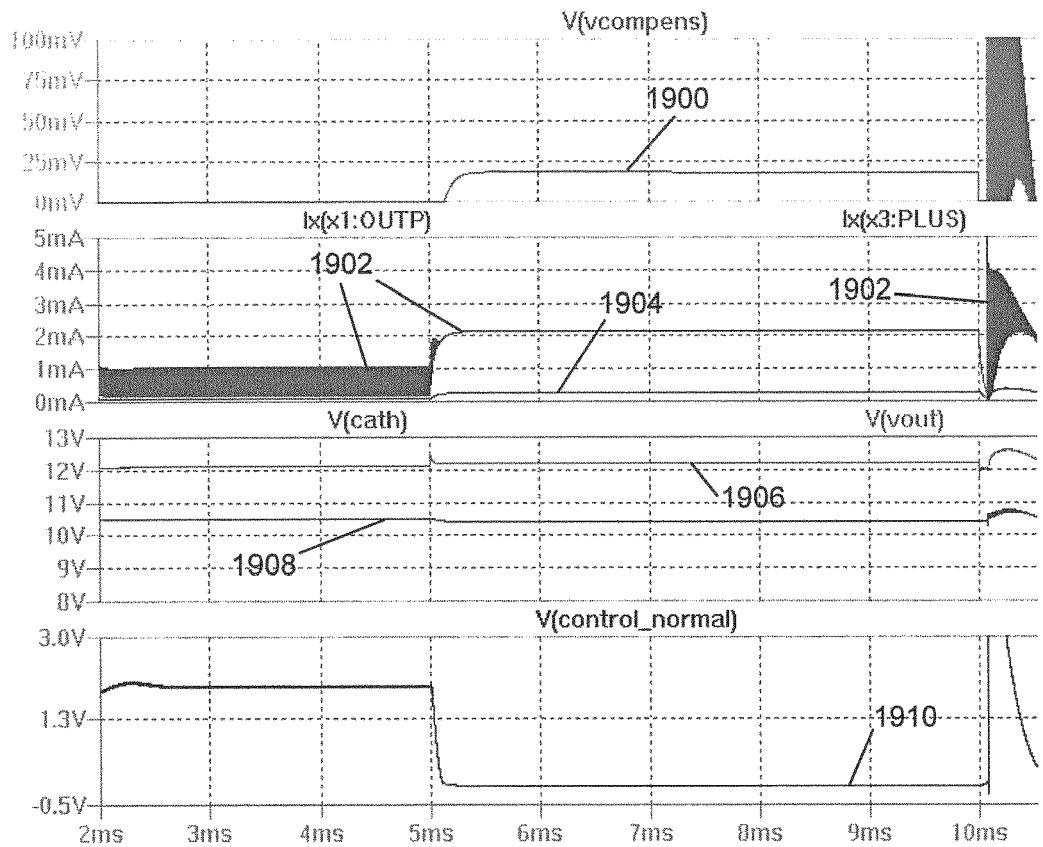
FIGS. 19 and 20 illustrate yet further example waveforms of other circuits.

FIG. 19 illustrates example waveforms of the same circuit that was used for FIG. 17 (with a non-linear compensation-resistor), with the CTR of the optocoupler increased to its worst case minimum (a factor 2 lower, which is 0.125 in this example), but this time with the threshold-current-level of the non-linear resistor set to 2 mA.

In contrast to FIG. 17, FIG. 19 shows that the SMPS is stable during normal steady state operation, as desired.

Figure 20:
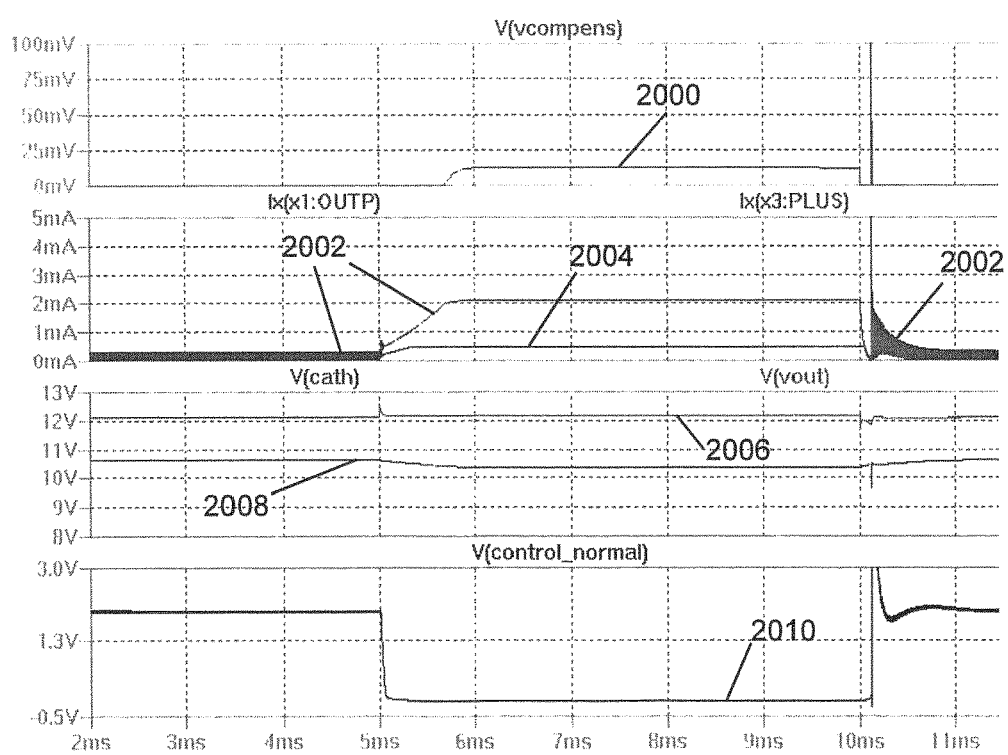

FIG. 20 illustrates example waveforms of the same circuit that was used for FIG. 19 (with a non-linear compensation-resistor), with the threshold-current-level of the non-linear resistor set to 2 mA, but this time with the CTR of the optocoupler increased to its worst case maximum (0.25 in this example).

FIG. 20 shows that Vcath 2008 now has to integrate more downwards than is shown in the plots of FIG. 16, for which the threshold-current-level of the non-linear resistor is 1 mA. This results in a higher opto current 2002.

In light of the above discussion, it has been appreciated by the inventors that there can be advantages to the threshold-current-level of the non-linear resistor being set as a point that is not too far above the level of opto current 2002 during steady state operation.

Therefore, any control arrangement disclosed herein, that uses a non-linear component with a threshold-current-level, can include a threshold-setting-block that can adaptively/dynamically set the threshold-current-level of the non-linear component based on an operating condition of the SMPS during normal steady state operation.

In one example, the threshold-setting-block can determine the optocoupler current at the secondary side periodically/regularly, and then determine an estimated-steady-state-current-level for the nominal value of the current through the LED of the optocoupler during steady state. In the example of FIG. 20, the estimated-steady-state-current-level for LED current 2002 would be about 0.3 mA (the level of ILED 2002 up to 5 ms). Similarly, in the example of FIG. 19, the estimated-steady-state-current-level for LED current 1902 would be about 1 mA.

The threshold-setting-block can then set the threshold-current-level of the non-linear component, for example to control the point at which the resistive part begins in FIG. 12 or 18 (shown as reference 1800 in FIG. 18) based on the estimated-steady-state-current-level. For example, the threshold-setting-block can apply a fixed-threshold-offset to the estimated-steady-state-current-level (such as 100 uA, 200 uA, 500 uA), in order to determine the threshold-current-level of the non-linear component. Alternatively, the threshold-setting-block can apply a relative-threshold-offset to the estimated-steady-state-current-level (such as multiplying by 1.1, 1.5, or 2). This method can negate the effects of CTR spread and CTR shift over life, while maintaining an improved/optimum value for the resistive part region.

It will be appreciated that the above discussion of a non-linear resistor can be used with embodiments that include a compensating-resistor in the ground path of a TL431 error amplifier, and also in any form of feedback based on the optocoupler current, including those that modify a reference voltage that is provided to a secondary-side controller.

The idea of using a non-linear component can be used not only in burst mode of an SMPS, but also during normal operation, including for load steps between high load and low load.

From reading the present disclosure, other variations and modifications will be apparent to the skilled person. Such variations and modifications may involve equivalent and other features which are already known in the art of control arrangements for switch mode power supplier, and which may be used instead of, or in addition to, features already described herein.

In particular, the skilled person will appreciate that although the figures have shown the secondary side of a resonant converter, the invention is not limited to resonant converters but may be equally applicable to other types of converters such as will readily come to mind, and without limitation fly back, buck converters.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A control arrangement for a switch mode power supply, the switch mode power supply comprising an opto-coupler configured to transfer, from a secondary side to a primary side of the switch mode power supply by means of an LED current, a control signal indicative of an error between an amplifier-reference-signal and an amplifier-sensed-signal indicative of an actual value of an output parameter, the control arrangement comprising:
    an error amplifier on the secondary side of the switch mode power supply and configured to integrate the error between the amplifier-reference-signal and the amplifier-sensed-signal to determine the LED current; and
    a feedback loop self contained on the secondary side of the switch mode power supply and configured to modify the amplifier-reference-signal based on the magnitude of the LED current in order to reduce the error between the amplifier-reference-signal and the amplifier-sensed-signal.

2. The control arrangement of claim 1, wherein the error amplifier is configured to provide an LED control signal for the LED, and wherein the feedback loop is configured to modify the amplifier-reference-signal based on the LED control signal.

3. The control arrangement of claim 1, wherein the feedback loop is configured to:
add a compensation-signal to a received-reference signal, in order to provide the amplifier-reference-signal in order to reduce the error.

4. The control arrangement of claim 1, wherein the feedback loop comprises a compensating-resistor that is configured to conduct the LED current, and wherein a voltage dropped across the compensating-resistor is configured to modify the amplifier-reference-signal.

5. The control arrangement of claim 4, further comprising a resistive divider configured to provide the amplifier-reference-signal, wherein the resistive divider includes the compensating-resistor.

6. The control arrangement of claim 5, wherein the LED is connected in parallel with a subset of the resistors in the resistive divider.

7. The control arrangement of claim 4, wherein the compensating-resistor comprises a non-linear resistor.

8. The control arrangement of claim 7, wherein the compensating-resistor is further configured to:
determine an estimated-steady-state-current-level for the LED current during steady state operation; and
set a threshold-current-level based on the estimated-steady-state-current-level.

9. A control arrangement according claim 1, wherein the output parameter is an output voltage.

10. A control arrangement according to claim 1, wherein the feedback loop is arranged to modify the integrating function of the error amplifier.

11. A method of controlling a switch mode power supply comprising an opto-coupler configured to transfer, from a secondary side to a primary side of the switch mode power supply by means of an LED current, a control signal indicative of an error between an amplifier-reference-signal and an amplifier-sensed-signal indicative of an actual value of an output parameter,
the method comprising:
deriving an LED current from the error between the amplifier-reference-signal and the amplifier-sensed-signal by integrating the error between the amplifier-reference-signal and the amplifier-sensed-signal; and
adjusting the magnitude of the LED current by modifying the amplifier-reference-signal based on the magnitude of the LED current in order to reduce the error between the amplifier-reference-signal and the amplifier-sensed-signal, wherein adjusting the magnitude of the LED current is effected in a feedback loop that is self contained on the secondary side of the switch mode power supply.

12. The method of claim 11, wherein modifying the amplifier-reference-signal in order to reduce the error between the amplifier-reference-signal and the amplifier-sensed-signal comprises:
adding a compensation-signal to a received-reference signal, in order to provide the amplifier-reference-signal.

13. A method of controlling a switch mode power supply comprising an opto-coupler configured to transfer, from a secondary side to a primary side of the switch mode power supply by means of an LED current, a control signal indicative of an error between an amplifier-reference-signal and an amplifier-sensed-signal indicative of an actual value of an output parameter,
the method comprising:
deriving an LED current from the error between the amplifier-reference-signal and the amplifier-sensed-signal by integrating the error between the amplifier-reference-signal and the amplifier-sensed-signal; and
reducing the magnitude of the LED current by modifying the amplifier-reference-signal based on the magnitude of the LED current in order to reduce the error between the amplifier-reference-signal and the amplifier-sensed-signal, wherein reducing the magnitude of the LED current is effected in a feedback loop that is self contained on the secondary side of the switch mode power supply.

14. The method of claim 13, wherein reducing the amplifier-reference-signal in order to reduce the error between the amplifier-reference-signal and the amplifier-sensed-signal comprises:
adding a compensation-signal to a received-reference signal, in order to provide the amplifier-reference-signal.

* * * * *